US009990199B2

(12) United States Patent
Danielsson et al.

(10) Patent No.: US 9,990,199 B2
(45) Date of Patent: Jun. 5, 2018

(54) CONDITIONAL FLOW WITH HARDWARE ACCELERATION

(71) Applicant: Axis AB, Lund (SE)

(72) Inventors: Niclas Danielsson, Lund (SE); Mikael Asker, Lund (SE); Hans-Peter Nilsson, Lund (SE); Markus Skans, Staffanstorp (SE); Mikael Pendse, Lund (SE)

(73) Assignee: Axis AB, Lund (SE)

( * ) Notice: Subject to any disclaimer, the term of this patent is extended or adjusted under 35 U.S.C. 154(b) by 424 days.

(21) Appl. No.: 14/859,041

(22) Filed: Sep. 18, 2015

(65) Prior Publication Data
US 2017/0083332 A1 Mar. 23, 2017

(51) Int. Cl.
G06F 9/30 (2006.01)
G06T 1/20 (2006.01)

(52) U.S. Cl.
CPC .......... *G06F 9/30058* (2013.01); *G06T 1/20* (2013.01)

(58) Field of Classification Search
None
See application file for complete search history.

(56) References Cited

U.S. PATENT DOCUMENTS

| 5,045,995 A | 9/1991 | Levinthal et al. |
| 6,457,117 B1 * | 9/2002 | Witt .................... G06F 9/30021 711/E12.043 |
| 6,735,681 B2 * | 5/2004 | Asano .................... G06F 9/382 711/123 |
| 6,947,047 B1 | 9/2005 | Moy et al. |
| 7,805,592 B2 * | 9/2010 | Joyce ................... G06F 9/3804 712/207 |
| 2015/0007182 A1 | 1/2015 | Rossbach et al. |

FOREIGN PATENT DOCUMENTS

EP 2287808 A2 7/2001

OTHER PUBLICATIONS

Eddy Z. Zhang et al. "Streamlining GPU applications on the fly", Proceedings of the 24th ACM International Conference on Supercomputing, ICS '10, Jan. 1, 2010, p. 115, New York, NY, USA. XP055024261.
Eddy Z. Zhang et al. "On-the-fly elimination of dynamic irregularities for GPU computing", 16th International Conference on Architectural Support for Programming Languages and Operating Systems, Mar. 5-11, 2011, Newport Beach, CA, USA, ACM, New York, NY, USA, Mar. 5, 2011, pp. 369-380. XP058001852.

(Continued)

*Primary Examiner* — Corey S Faherty
(74) *Attorney, Agent, or Firm* — Snyder, Clark, Lesch & Chung, LLP

(57) ABSTRACT

A method and system are disclosed. The method may include receiving instructions in a hardware accelerator coupled to a computing device. The instructions may describe operations and data dependencies between the operations. The operations and the data dependencies may be predetermined. The method may include performing a splitter operation in the hardware accelerator, performing an operation in each of a plurality of branches, and performing a combiner operation in the hardware accelerator.

20 Claims, 14 Drawing Sheets

(56) References Cited

OTHER PUBLICATIONS

Wilson W. L. Fung et al. "Dynamic Warp Formation and Scheduling for Efficient GPU Control Flow", 40th Annual IEEE/ACM International Symposium on Microarchitecture (Micro 2007), Jan. 1, 2007, pp. 407-420. XP055092511.
Zheng Cui et al. "An Accurate GPU Performance Model for Effective Control Flow Divergence Optimization", 2012 IEEE 26th International Parallel and Distributed Processing Symposium, May 1, 2012, pp. 83-94. XP55275142.
Wilson W. L. Fung et al. "Dynamic Warp Formation", ACM Transactions on Architecture and Code Optimization, vol. 6, No. 2, Jun. 1, 2009, pp. 1-37. XP055010433.
Jiayuan Meng et al. "Dynamic warp subdivision for integrated branch and memory divergence tolerance", ACM Sigarch Computer Architecture News, vol. 38, Jan. 1, 2010, p. 235. XP055092509.
Bruno Coutinho et al. "Divergence Analysis and Optimizations", Parallel Architectures and Compilation Techniques (PACT), 2011 International Conference on, IEEE, Oct. 10, 2011, pp. 320-329. XP032083340.
Anantpur Jayvant et al. "Taming Control Divergence in GPUs through Control Flow Linearization", Apr. 5, 2014, Correct System Design; [Lecture Notes in Computer Science; Lect. Notes Computer], Springer International Publishing, pp. 133-153. XP047268996.
Extended European Search Report and Written Opinion issued for the corresponding European Application No. 15199583.4, dated Jun. 29, 2016, 10 pages.
Veynu Narasiman et al., "Improving GPU performance via large warps and two-level warp scheduling," Proceeding MICRO-44 '11 Proceedings of the 44th Annual IEEE/ACM International Symposium on Microarchitecture, Porto Alegre, Brazil, p. 308, Jan. 1, 2011.
Owaida, Muhsen et al., "Synthesis of Platform Architectures from OpenCL Programs," IEEE International Symposium on Field-Programmable Custom Computing Machines, IEEE Computer Society, pp. 187-193, (2011).
Shen, Changsong et al., "Towards OpenVL: Improving Real-Time Performance of Computer Vision Applications," University of British Columbia, Vancouver, BC, Canada, pp. 195-216, (2009).

* cited by examiner

CONDITIONAL FLOW WITH HARDWARE ACCELERATION

BACKGROUND INFORMATION

As cameras and other monitoring devices become less expensive, these devices are proliferating. As these devices proliferate, the cameras and devices are being used for computer vision applications, including acquiring, processing, analyzing, and understanding images. Computer vision applications may use hardware accelerators to perform some functions. In addition to computer vision applications, other applications user hardware accelerators in heterogeneous computing environments.

SUMMARY

A system is disclosed herein. In one embodiment, the system includes a computing device, and a hardware accelerator coupled to the computing device. In one embodiment, the hardware accelerator receives instructions describing operations and data dependencies between the operations, wherein the operations and the data dependencies are predetermined. The instructions cause the hardware accelerator to perform, in one embodiment, a splitter operation. The splitter operation may input a decision value and data to be processed; output, based on the decision value, the data to be processed, flagged as active, to one of a plurality of branches of data dependencies and operations, and output, based on the decision value, an inactive flag to a different one of the plurality of branches. each branch may include an operation to input the data to be processed, flagged as active, output by the splitter operation, perform a calculation on the data to be processed, flagged as active, and output processed data flagged as active, and output an inactive flag when the inactive flag is accessed via the splitter operation. The instructions cause the hardware accelerator to perform, in one embodiment, a combiner operation. The combiner operation may input processed data, flagged as active from one of the branches, and input an inactive flag from another one of the branches, and output the processed data.

In one embodiment of the system, the data dependency of each of the plurality of branches is independent of each other branch.

In another embodiment of the system, the instructions describe the data dependencies between the operations without explicitly-stated ordering of execution of operations.

In another embodiment of the system, the splitter operation outputs, based on the decision value, a dummy data set with the inactive flag to the different one of the branches of data dependencies.

In another embodiment of the system, the operation in one branch inputs data not dependent on the output of the splitter operation.

In another operation of the system, the hardware accelerator outputs data dependent on the operation in one of the branches and not dependent on the combiner operation.

In another embodiment of the system, the instructions cause the hardware accelerator to perform a decision operation. The decision operation may output the decision value, wherein the decision value is one of more than two values.

In another embodiment of the system, the splitter operation inputs a plurality of data sets to be processed. In this embodiment, the splitter operation outputs, based on the decision value, each of the data sets to be processed, flagged as active, to one of more than two branches of data dependencies and operations. In this embodiment, the splitter operation outputs, based on the decision value, an inactive flag to a different one of the branches for each of the data sets.

In another embodiment of the system, each of the plurality of data sets to be processed is a tile of an image. In another embodiment of the system, one of the plurality of branches includes an additional splitter operator and an additional combiner operator.

Methods are disclosed. In one embodiment, the method includes receiving instructions in a hardware accelerator coupled to a computing device. The instructions describe operations and data dependencies between the operations, and the operations and the data dependencies may be predetermined. The method may include performing a splitter operation in the hardware accelerator that includes inputting a decision value and data to be processed; outputting, based on the decision value, the data to be processed, flagged as active, to one of a plurality of branches of data dependencies and operations; and outputting, based on the decision value, an inactive flag to a different one of the plurality of branches. The method may include performing an operation in each branch including inputting the data to be processed, flagged as active, output by the splitter operation; and performing a calculation on the data to be processed, flagged as active, and outputting processed data flagged as active; and outputting an inactive flag when the inactive flag is accessed via the splitter operation. The method may include performing a combiner operation in the hardware accelerator including inputting processed data, flagged as active from one of the plurality of branches, and input an inactive flag from another one of the plurality of branches; and outputting the processed data.

In one embodiment of the method, the data dependency of each of the plurality of branches is independent of each other branch.

In another embodiment of the method, the instructions describe the data dependencies between the operations without explicitly-stated ordering of execution of operations.

In another embodiment of the method, performing the splitter operation includes outputting, based on the decision value, a dummy data set with the inactive flag to the different one of the branches of data dependencies.

In another embodiment of the method, performing the operation in one branch includes inputting data not dependent on the output of the splitter operation.

In another embodiment, the method further comprises outputting data dependent on the operation in one of the branches and not dependent on the combiner operation.

In another embodiment, the method further comprises performing a decision operation that outputs the decision value, wherein the decision value is one of more than two values.

In another embodiment of the method, performing the splitter operation includes inputting a plurality of data sets to be processed; outputting, based on the decision value, each of the data sets to be processed, flagged as active, to one of more than two branches of data dependencies and operations; and outputting, based on the decision value, an inactive flag to a different one of the branches for each of the data sets.

In another embodiment of the method, each of the plurality of data sets to be processed is a tile of an image.

In another embodiment of the method, performing an operation in each branch includes performing an additional splitting operation and performing an additional combiner operation.

DETAILED DESCRIPTION OF EMBODIMENTS

Figure 1:
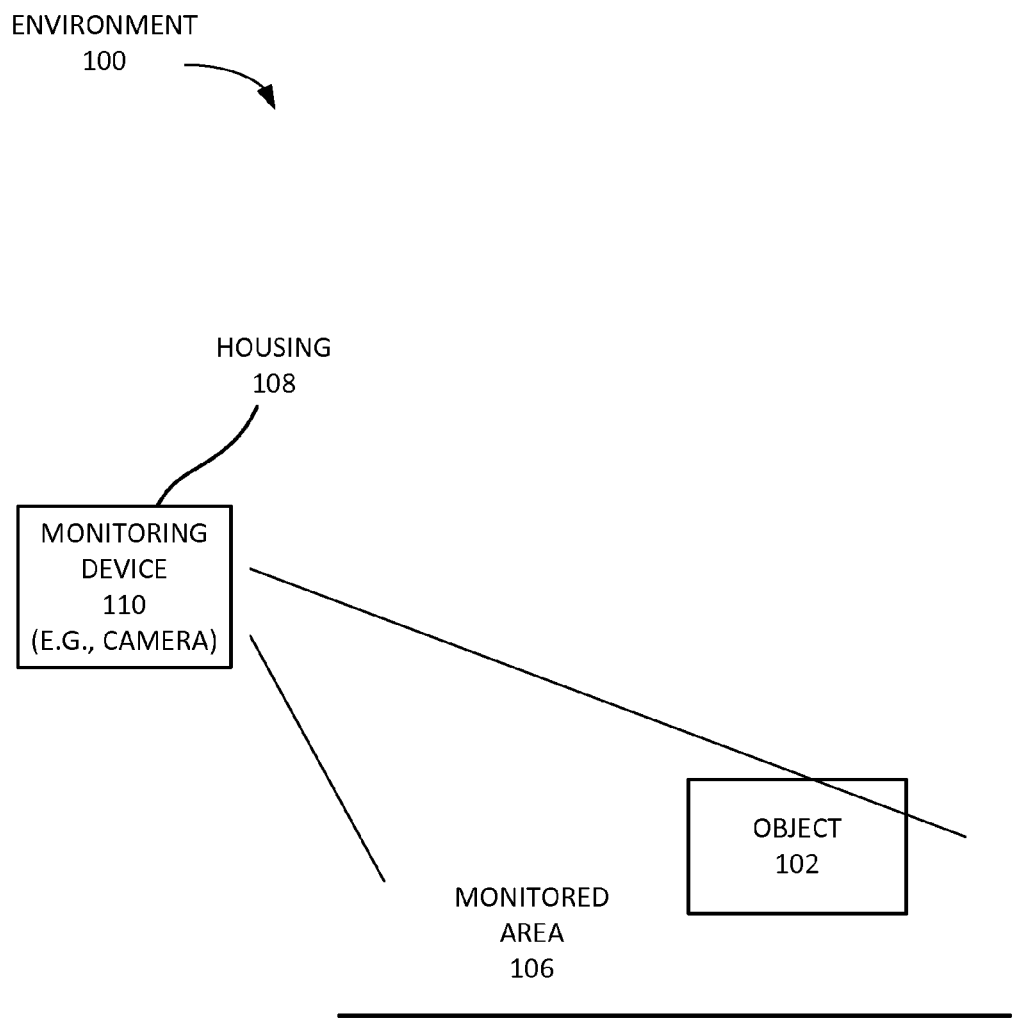
FIG. 1 is a diagram of an exemplary monitoring device (e.g., a camera) monitoring an area with an object in one embodiment.

The following detailed description refers to the accompanying drawings. The same reference numbers in different drawings identify the same or similar elements.

Cameras and other devices often have limited processing power to perform image processing (such as computer vision, object detection or recognition, contrast enhancement, etc.). The limited processing power of a camera makes object and feature recognition (e.g., by the camera) more challenging than if processing power were not a limiting factor. While a server computer may have more processing power than a camera, in some instances a server may not be well situated to perform object recognition. That is, the server may be remotely located from the camera, and bandwidth between the camera and the server may be limited. In addition, a camera may alter raw image data (e.g., demosaicing and/or lossy compression) to conserve bandwidth before transmitting an image or video to another device. Therefore, a server may not have access to the best image data captured by the camera and may not have the best data to perform object or feature recognition.

To improve performance, cameras (and other devices) may incorporate specialized hardware for some tasks, such as computer vision. This specialized hardware may include hardware accelerators with parallel processors or vector processors, for example. These hardware accelerators may interact with other types of processors (e.g., a scalar processor and/or a threaded processor) in a heterogeneous computing environment. The hardware accelerators may include graphical processor units (GPUs), general-purpose GPUs (GPGPUs), field programmable arrays (FPGAs), Cell processors, many integrated core processors (MICs), etc. In some instances, general purpose processors may include hardware acceleration within a general processor, creating a heterogeneous environment in a single system on a chip (SoC). Such a hardware accelerator may include additional architectures and/or instructions sets (e.g., streaming single instruction multiple data extensions (SSE), Advanced Vector Extensions (AVX), etc.) to improve processing efficiencies for some tasks (e.g., providing hardware acceleration within a general processor).

Writing application code for a heterogeneous environment is often more challenging when compared to writing application code for a homogeneous environment. Programming in heterogeneous environments can be difficult because developing programs that make best use of characteristics of different types of processors increases the programmer's burden. A heterogeneous environment also increases code complexity and decreases portability by requiring hardware-specific code. In particular, balancing the application workload across processors can be challenging, especially because the different processor types have different performance, timing characteristics, instruction sets, and programming paradigms.

In some instances, data transfer between the different types of processors (i.e., to and from the hardware accelerator and a general processor) must be explicit within the application code itself. In some instances (but not necessarily all), data must first be explicitly aggregated by the application code in addition to being explicitly moved to and from the hardware accelerator. In particular, data transfer can be challenging for computer vision applications because of the amount of data involved (e.g., images and video may occupy a large amount of data).

The explicit manipulation of large amounts of data for use by a hardware accelerator is less than ideal for several reasons. First, it decreases the portability of application code by making the code more architecturally specific. Second, the code used to accomplish this explicit data movement commonly appears interleaved throughout the application code. This interleaving of architecture-specific code throughout the application code complicates efforts to port the code by making it harder to identify and extract the architecture-specific code from the other application code. Interleaving code in these instances is sometimes preferable for increased performance, which is often the goal to begin with given the use of a hardware accelerator.

Third, the movement of large amounts of data to and from the hardware accelerator takes time and power, which are often limited in a camera (and other devices). Accordingly, application architecture that can reduce the amount of data being transferred to and from the hardware accelerator may improve performance, simplify the programmer's burden, and increase code portability.

As noted above, hardware acceleration components may have additional or different architectures and/or instructions sets to improve processing efficiencies for some tasks (e.g., as compared to a general processor). Some hardware accelerators use parallel or vector processing for "single instruction, multiple data" (SIMD) processing. These types of processors often use data-parallel instruction sets that may not define an order of the instances. These SIMD instruction sets include SSE and AVX, for example. Such instruction sets for hardware processors, however, introduce additional challenges for a programmer. In particular, the challenge is divergent control flow, such as a conditional jump (or "conditional flow"). As a result, conditional jumps may be performed in the general processor, but at the expense of moving data to and from the hardware accelerator.

Methods and systems described below enable a camera (or any device) to perform computer vision applications (or any other type of application) on a hardware accelerator while handling divergent control flow and minimizing (or reducing) data movement between the heterogeneous processors (e.g., the general processor and the hardware accelerator) (or between the memory associated with those processors). Thus, methods and systems disclosed herein may allow for a camera to detect features or objects in an image and/or video with, in one embodiment, the limited processing power of a camera.

The methods and systems described below may be used to perform tasks (e.g., in a hardware accelerator such as a GPU or GPGPU) other than for computer vision. Further, even though embodiments described below enable a camera with limited processing power to perform computer vision (including detecting features in an image), the methods described below may be used by devices other than cameras with more powerful processors, such as a server. In this case, the methods and systems described below may allow for the server to process more images more quickly, for example, with the given processing power. Servers may also be more suitable for processing images taken with sensors having very high resolutions (e.g., ultra-high definition).

FIG. 1 is a diagram of an exemplary environment 100 in one embodiment, which includes a monitoring device 110 (e.g., a monitoring camera) monitoring an area 106 with an object 102. Object 102 may include a person, an animal, a vehicle, a license plate on a vehicle, etc. An image of object 102 captured by monitoring device 110 may include features that allow for identifying or recognizing object 102. Monitoring device 110 has a housing 108.

Monitoring device 110 may include one or more devices for capturing images of monitored area 106. Monitoring device 110 may include, for example, a video camera that captures image data using visible light, infrared light, and/or other non-visible electromagnetic radiation (e.g., a radar for radar imaging). The captured image data may include a continuous image sequence (e.g., video), a limited image sequence, still images, and/or a combination thereof. Monitoring device 110 may include a digital camera for capturing and digitizing images and/or an analog camera for capturing images and storing image data in an analog format.

Monitoring device 110 may recognize features of objects in captured images of those objects. Monitoring device 110 may recognize the object based on whether the captured image has features that match "characterizing features" associated with the object, for example. Monitoring device 110 may use a hardware accelerator, such as a graphics processing unit, to perform operations, such as recognizing objects in images.

Monitoring device 110 may include sensors which may produce data arranged in one or more two-dimensional array(s) (e.g., image data or video data). Monitoring device 110 and its sensors may include a camera, such as a thermal camera, a radar (e.g., for radar imaging), etc. In another embodiment, device 110 may include a controller with one or more peripherals connected to the controller (such as a camera). Monitoring device 110 may be used, for example, in a physical access control system (PACS) to identity of a person attempting to gain access to a secure area.

Although FIG. 1 shows exemplary components of environment 100, in other implementations, environment 100 may include fewer components, different components, differently arranged components, or additional components than depicted in FIG. 1. Additionally or alternatively, any one device (or any group of devices) may perform functions described as performed by one or more other devices.

Figure 2:
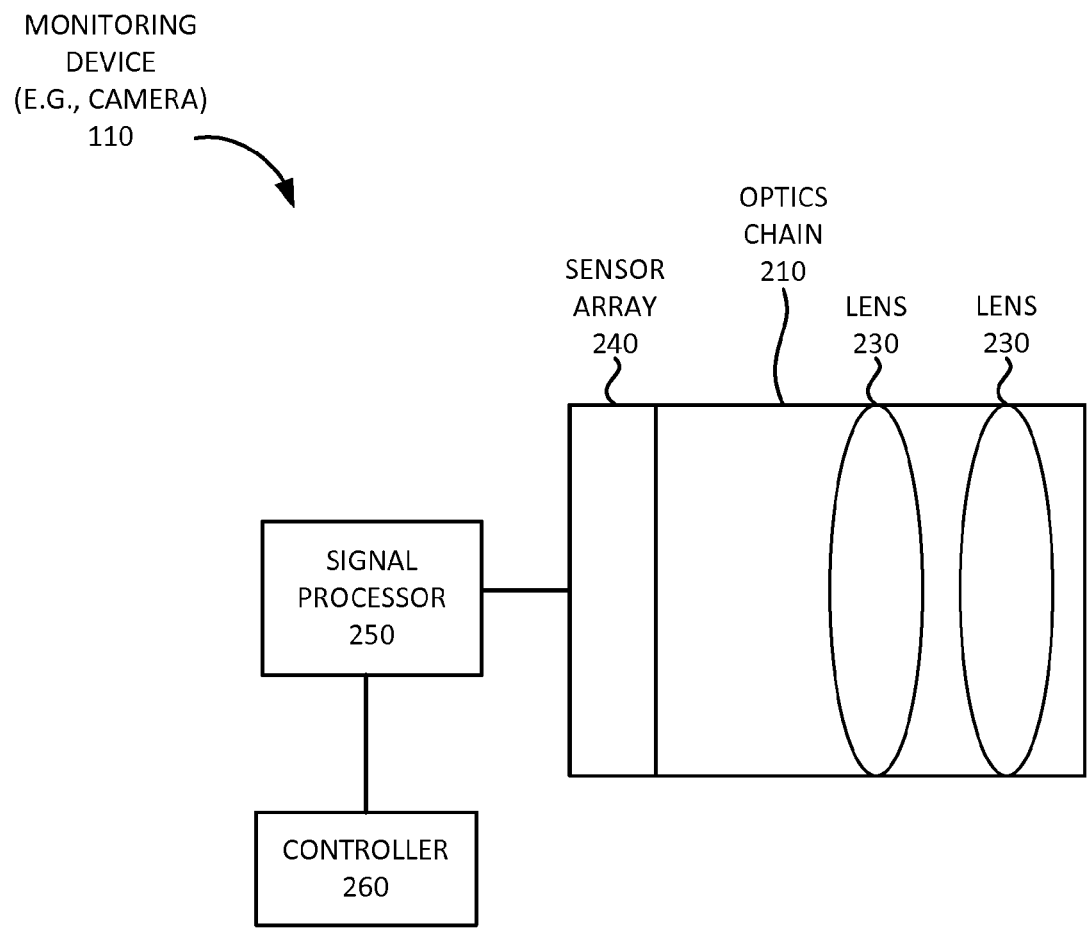
FIG. 2 is a block diagram illustrating exemplary components of a monitoring device (e.g., a camera) in one embodiment.

FIG. 2 is a diagram illustrating exemplary components of a monitoring device 110 (alternatively referred to as "camera 110") implemented as a camera in one embodiment. As shown in FIG. 2, camera 110 may include an optics chain 210, a sensor array 240, a signal processor 250, and a controller 260.

Optics chain 210 may include an enclosure that directs incident radiation (e.g., light, visible light, infrared waves, millimeter waves, etc.) to a sensor array 240 to capture an image based on the incident radiation. Optics chain 210 may include lenses 230, as well as the sensor array 240. Lenses 230 may collect and focus the incident radiation from monitored area 106 onto sensor array 240.

Sensor array 240 may include an array of sensors for registering, sensing, and measuring radiation (e.g., light) incident or falling onto sensor array 240. The radiation may be in the visible light wavelength range, the infrared wavelength range, or other wavelength ranges. Sensor array 240 may include, for example, a charged coupled device (CCD) array and/or an active pixel array (e.g., a complementary metal-oxide-semiconductor (CMOS) sensor array). Sensor array 240 may also include a microbolometer (e.g., when camera 110 includes a thermal camera or detector).

Sensor array 240 outputs data that is indicative of (e.g., describes properties or characteristics) the radiation (e.g., light) incident on sensor array 240. For example, the data output from sensor array 240 may include information such as the intensity of light (e.g., luminance), color, etc., incident on one or more pixels in sensor array 240. The light incident on sensor array 240 may be an "image" in that the light may be focused as a result of lenses 230. Sensor array 240 can be considered an "image sensor" because it senses images falling on sensor array 240. As the term is used herein, an "image" includes the data indicative of the radiation (e.g., describing the properties or characteristics of the light) incident on sensor array 240. Accordingly, the term "image" may also be used to mean "image sensor data" or any data or data set describing an image. Further, a "pixel" may mean any region or area of sensor array 240 for which measurement(s) of radiation are taken (e.g., measurements that are indicative of the light incident on sensor array 240). A pixel may correspond to one or more (or less than one) sensor(s) in sensor array 240. In alternative embodiments, sensor 240 may be a linear array that may use scanning hardware (e.g., a rotating mirror) to form images, or a non-array sensor which may rely upon signal processor 250 and/or controller 260 to produce image sensor data.

Signal processor 250 performs signal processing operations on image data captured by sensor array 240. Controller 260 may control the operation of signal processor 250 as well as the rest of camera 110. Controller 260 (e.g., in conjunction with signal processor 250) may perform signal processing on images, such as object recognition. Operation of controller 260 and/or signal processor 250 is described below in greater detail.

Although FIG. 2 shows exemplary components of camera 110, in other implementations, camera 110 may include fewer components, different components, differently arranged components, or additional components than depicted in FIG. 2. Additionally or alternatively, one or more components of camera 110 may perform functions described as performed by one or more other components of camera 110. For example, controller 260 may perform functions described as performed by signal processor 250 and vice versa.

Figure 3:
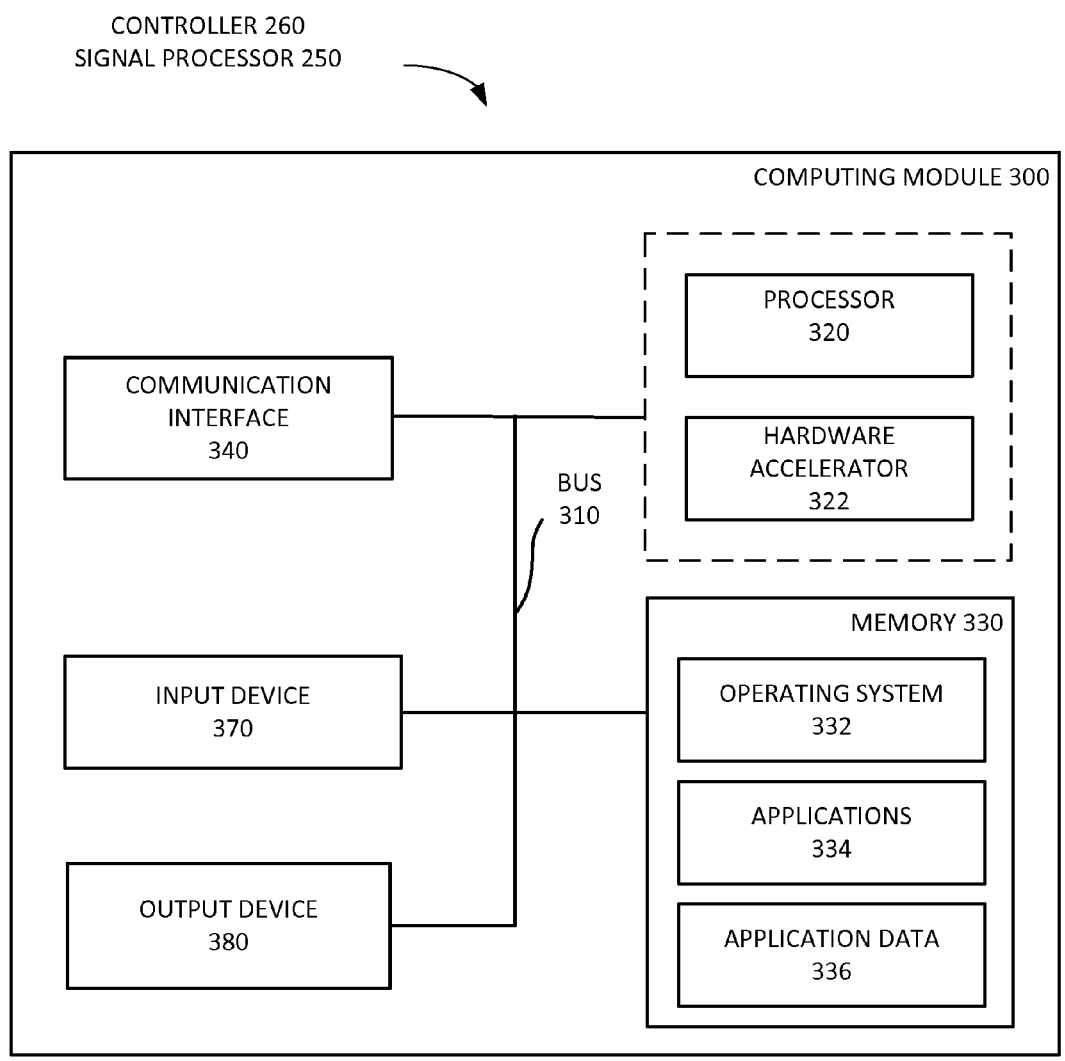
FIG. 3 is a block diagram of exemplary components of a computing module in one embodiment.

FIG. 3 is a block diagram illustrating exemplary components of a computing module 300 in one embodiment. Controller 260 and/or signal processor 250 in camera 110 may include a computing module 300. As shown in FIG. 3, computing module 300 may include a bus 310, a processor 320, a hardware accelerator 322, a memory 330, and a communication interface 340. In some implementations, computing module 300 may also include an input device 370 and an output device 380. Bus 310 includes a path that permits communication among the components of computing module 300 or other devices.

Processor 320 may include any type of single-core processor, multi-core processor, microprocessor, latch-based processor, and/or processing logic (or families of processors, microprocessors, and/or processing logics) that interprets and executes instructions. Processor 320 may include an application-specific integrated circuit (ASIC), an field programmable gate array (FPGA), and/or another type of integrated circuit or processing logic.

Hardware accelerator 322 may include a GPU, a GPGPU, a Cell, a FPGA, an ASIC, a MIC processor, and/or another type of integrated circuit or processing logic. In one embodiment, processor 320 may include hardware accelerator 322. In other embodiments, processor 320 may be a separate component from hardware accelerator 322. In either case, hardware accelerator 322 communicates with other components (e.g., memory 330, processor 320, etc.) over bus or data path 310.

As noted, hardware accelerator 322 may be a separate component or chip in computing module 300 (e.g., separate from a processor 320). As such, in this embodiment, computing module 300 is a heterogeneous environment in that it includes more than one kind of processor (such as a specialized, hardware accelerator processor and a general processor).

Memory 330 may include any type of volatile and/or non-volatile storage device that stores information and/or instructions. Memory 330 may include a random access memory (RAM) or any type of dynamic storage device, a read-only memory (ROM) device or any type of static storage device, a content addressable memory (CAM), a magnetic or optical recording memory device and its corresponding drive, or a removable memory device. Memory 330 may store information and instructions (e.g., applications 334 and operating system 332) and data (e.g., application data 336) for use by processor 320.

Memory 330 may store instructions for execution by processor 320 and/or hardware accelerator 322. The software instructions may be read into memory 330 from another computer-readable medium or from another device (e.g., an application received from another device). The software instructions contained in memory 330 may cause processor 320 and/or hardware accelerator 322 to perform processes described herein. Alternatively, hardwired circuitry (e.g., logic) may be used in place of, or in combination with, software instructions to implement processes described herein. Thus, implementations described herein are not limited to any specific combination of hardware circuitry and software.

Operating system 332 may include software instructions for managing hardware and software resources of computing module 300. For example, operating system 332 may include Linux, Windows, OS X, Android, an embedded operating system, etc. Applications 334 and application data 336 may provide network services or include applications, depending on the device in which the particular computing module 300 is found.

Communication interface 340 may include a transceiver (e.g., transmitter and/or receiver) that enables computing module 300 to communicate with other components, devices, and/or systems. Communication interface 340 may communicate via wireless communications (e.g., radio frequency, infrared, etc.), wired communications, or a combination thereof. Communication interface 340 may include a transceiver that converts baseband signals to radio frequency (RF) signals or vice versa and may be coupled to an antenna.

Communication interface 340 may include a logical component that includes input and/or output ports, input and/or output systems, and/or other input and output components that facilitate the transmission of data to other devices. For example, communication interface 340 may include a network interface card (e.g., Ethernet card) for wired communications or a wireless network interface (e.g., a WiFi) card for wireless communications.

Computing module 300 (e.g., controller 260 and/or signal processor 250 in camera 110) may perform operations relating to the detection of objects in images and detecting objects in images. Computing module 300 (as part of camera 110) may perform these operations in response to processor 320 and/or hardware accelerator 322 executing software instructions contained in a computer-readable medium, such as memory 330.

Some devices may also include input device 370 and output device 380. Input device 370 may enable a user to input information into computing module 300. Input device 370 may include a keyboard, a mouse, a pen, a microphone, a camera, a touch-screen display, etc. Output device 380 may output information to the user. Output device 380 may include a display, a printer, a speaker, etc. Input device 370 and output device 380 may enable a user interact with applications executed by computing module 300. In the case of a "headless" device (such as a deployed remote camera), input and output is primarily through communication interface 340 rather than input device 370 and output device 380.

Computing module 300 may include other components (not shown) that aid in receiving, transmitting, and/or processing data. Moreover, other configurations of components in computing module 300 are possible. In other implementations, computing module 300 may include fewer components, different components, additional components, or differently arranged components than depicted in FIG. 3. Additionally or alternatively, one or more components of computing module 300 may perform one or more tasks described as being performed by one or more other components of computing module 300.

Figure 4:
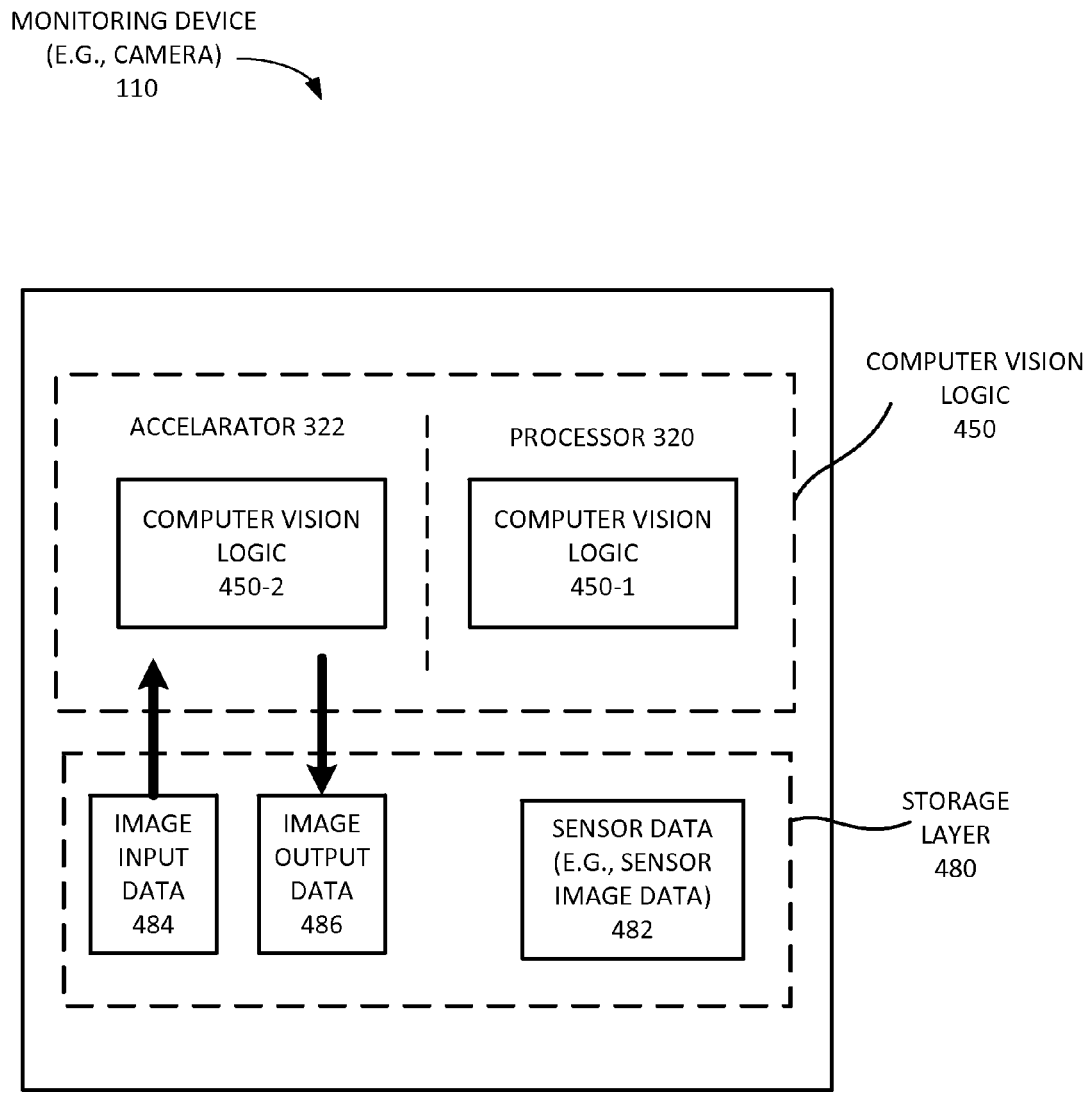
FIG. 4 is a block diagram illustrating exemplary functional components of the camera of FIG. 2.

FIG. 4 is a block diagram illustrating exemplary functional components of camera 110 (e.g., controller 260 and/or signal processor 250). The functional components of camera 110 may be implemented, for example, in a computer module 300 (or computing device 200; i.e., processor 320 and/or hardware accelerator 322 executing instructions from memory 330).

As shown in FIG. 4, camera 110 may include computer vision logic 450 and storage layer 480. Camera 110 uses storage layer 480 to store image data 482 (e.g., from sensor array 240). Computer vision logic 450 operates on image data (e.g., image input data 484) and performs operations, such as object recognition, defogging, etc., and outputs image data (e.g., image output data 486).

Computer vision logic 450 may have two components: logic 450-1 that is performed by processor 320 and another logic 450-2 that is performed by hardware accelerator 322. Thus, computer vision logic 450 is an application in a heterogeneous system in this example. In particular, hardware accelerator 322 inputs image input data 484, performs logic on the input data 484, and outputs data to image output data 486. Because input data 484 and output data 486 relate to images, the amount of data transferred between storage layer 480 and hardware accelerator 322 can be substantial and a factor in the performance of camera 110 when performing computer vision applications.

In another embodiment, hardware accelerator 322 and processor 320 perform functions other than computer vision with computer vision logic 450. Further, in other embodiments, hardware accelerator 322 inputs data other than image data and/or outputs data other than image data.

Although FIG. 4 shows exemplary components of camera 110 (e.g., monitoring device 110), in other implementations, camera 110 may include fewer components, different components, differently arranged components, or additional components than depicted in FIG. 4. Additionally or alternatively, any one component (or any group of components) in FIG. 4 may perform functions described as performed by one or more other components.

As noted above, computer vision logic 450 has a component (logic 450-2) in processor 320 and another component (logic 450-2) in hardware accelerator 322. FIGS. 5A through 5E are diagrams of the logic component 450-2 (or "graph") in accelerator 322 (along with data and data dependencies) in different embodiments. The operators and data dependencies (e.g. graph) may be defined by instructions received by the hardware accelerator from processor 320 and/or storage layer 480. Further, in one embodiment, the operators and data dependencies (e.g., graph) may be predetermined in that they are determined before receiving them. That is, the operators and data dependencies may be defined by the instructions as received by the hardware accelerator. In another embodiment, the instructions may be hardwired or fixed in hardware accelerator 322 or the instructions and data dependencies may not be predetermined.

In FIGS. 5A through 5D, operators are shown as ellipses, data are shown as rectangles, and data dependencies are shown with arrows (which may also be referred to as an "edge" of the graph). In one embodiment, instructions describe the data dependencies between the operations without explicitly-stated ordering of execution of operations.

Figure 5A:
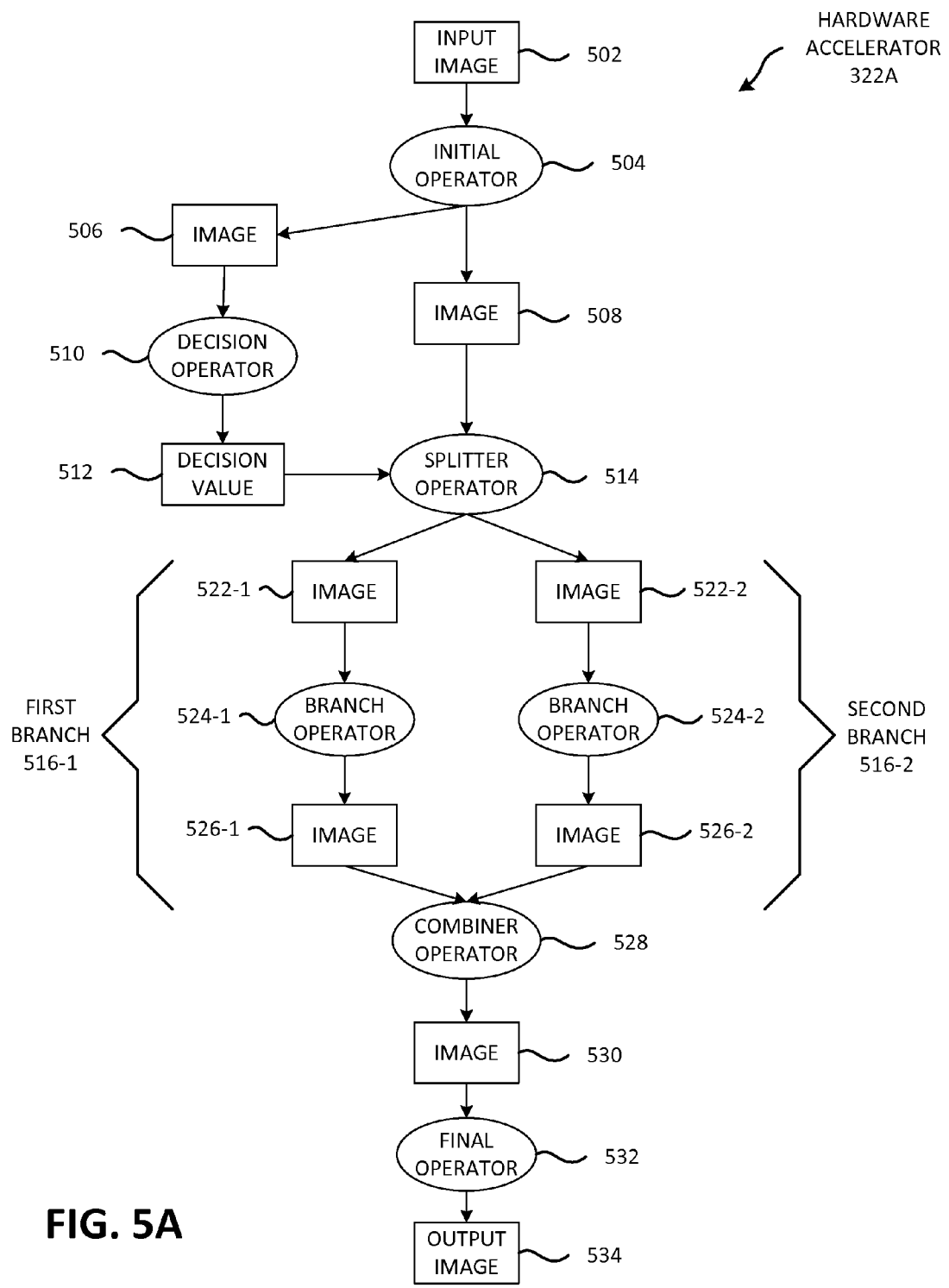
FIGS. 5A, 5B, 5C, 5D, and 5E are diagrams of exemplary operators, data, and data dependencies (i.e., graphs) in the hardware accelerator of FIG. 3 in different embodiments or implementations.

Operators in FIG. 5A include an initial operator 504, a decision operator 510, a splitter operator 514, a first branch operator 524-1, a second branch operator 524-2, a combiner operator 528, and a final operator 532. FIG. 5A also shows two branches: a first branch 516-1 and second branch 516-2. Each branch 516 may include branch operator 524. As shown in FIG. 5A, first branch 516-1 includes first branch operator 524-1 and second branch 516-2 includes second branch operator 524-2. First branch operator 524-1 may be a different operator than second branch operator 524-2, although both may be referred to collectively as "branch operator 524." Operators 504, 510, 514, 524, 528, and 532 perform operations described below (e.g., splitter operator 514 performs a splitter operation, decision operator 510 performs a decision operation, branch operator 524 performs an operation associated with the branch 516, and combiner operator 528 performs a combiner operation). In one embodiment, the data dependency of each of the plurality of branches is independent of each other branch.

Although FIG. 5A shows exemplary operators, data, and data dependencies in hardware accelerator 322, in other implementations, hardware accelerator 322 may include fewer operators or data sets, differently arranged operators or data sets (including different dependencies), or additional operators or data sets than depicted in FIG. 5A. For example, in one implementation, hardware accelerator 322 may not include initial operator 504 or final operator 532.

Initial operator 504 inputs input image 502 (e.g., input data 484 shown in FIG. 4) and performs an initial operation and/or calculation input image 502. Initial operator 504 outputs two images in this example: image 506 and image 508. Initial operator 504 may include, for example, an initial operation for contrast enhancement, defogging, object recognition, etc. As noted above, in one implementation, hardware accelerator 322 does include initial operator 504.

Decision operator 510 decides which of branches 516 will be used to process data. In the example of FIG. 5A, decision operator 510 bases this decision on image 506. Decision operator 510 outputs decision value 512. For example, decision operator 510 may determine the noise in image 506 and output a decision value 512 based on the noise present in image 506. As another example, decision operator 510 may determine whether the intensity values in an image are bimodal or not (e.g., for a defogging process) and output the result as decision value 512.

In the example of FIG. 5A, decision value 512 may be a '0' or a '1' (or any way of expressing a decision between two branches 516). A decision value of '0' indicates that first branch 516-1 is to be selected by splitter operator 514. On the other hand, a decision value of '1' indicates that second branch 516-2 is to be selected by splitter operator 514.

Given the nature of accelerator 322, an operator (e.g., splitter 514, branch operator 524, combiner operator 528, etc.) performs its operation (e.g., calculation on inputs) when all its inputs are ready (e.g., marked as ready or are present). Further an operator outputs its output data as soon as it is ready (e.g., processed data).

In the example of FIG. 5A, splitter operator 514 inputs a decision value 512 and data to be processed (e.g., image 508, image data, or a data set). Splitter operator 514 outputs, based on the decision value 512, the data to be processed, flagged as active, to one of a plurality of branches of data dependencies and operations. Splitter operator 514 also outputs, based on the decision value, an inactive flag to a different one of the branches. The inactive flag may be associated with an empty or null output data set (e.g., such as an empty image or dummy data set). In one embodiment, the active or inactive flag may be stored in the header of output image data.

Decision value 512, for example, may be a '0' or a '1'. When decision value 512 is present and image 508 is present, splitter operator 514 outputs image 522-1 to first leg and image 522-2 to second leg. First, assume that decision value is '0'. If decision value 512 is '0', the output image 522-1 (in first branch 516-1) is a copy of the input image 508 with an active flag. Further, if decision value 512 is '0', the output image 522-2 (in second branch 516-2) may be empty or null but with an inactive flag. In fact, output image 522-2 (in second branch 516-2) may also be a copy of input image 508 (or any data) that is associated with an inactive flag.

Second, assume that decision value 512 is '1'. If decision value 512 is '1', output image 522-2 (in second branch 516-2) is a copy of the input image 508 with an active flag. Further, if decision value 512 is '1', the output image 522-1 (in first branch 516-1) may be empty or null but with an inactive flag. As noted above, output image 522-1 (in first branch 516-1) may also be a copy of input image 508 (or any other data) that is associated with an inactive flag. Although splitter operator 514 in FIG. 5A has only one input and two outputs, in other embodiments (discussed below), splitter operator 514 may have more than one input and more than two outputs.

As with splitter operator 514, branch operator 524 performs its corresponding operation (e.g., calculation on inputs) when all its inputs are present (e.g., are ready). Further branch operator 524 outputs data (e.g., processed data) as soon as it is ready. As shown in FIG. 5A, branch operator 524 performs an operation on image 522 (e.g., image 522-1 if branch operator 524-1 and image 522-2 if branch operator 524-2). Further, branch operator 524 outputs image 526 as processed data (e.g., image 526-1 if branch operator 524-1 and image 526-2 if branch operator 524-2).

In particular, branch operators 524 input data to be processed (e.g., image 522), flagged as active, output by the splitter operator 514. When flagged as active, a branch operator 524 performs a calculation on the data to be processed (e.g., image 522) and outputs processed data, also flagged as active (e.g., image 526). Branch operators 524 may include, for example, an operation for contrast enhancement, defogging, object recognition, etc. Branch operators 524 may also input data, flagged as inactive (e.g., image 522), output by the splitter operator 514. When input data is flagged as inactive, branch operator 524 outputs an inactive flag (e.g., image 526 with an inactive flag). As with the splitter operator, the image 526 may be any data that is associated with an inactive flag. The calculations performed by a branch operator 524 on the input image 522 (associated with an inactive flag) would be effectively none, given the association with an inactive flag.

Assume that decision value 512 is '0'. Decision operator, for example, may output a '0' when image 506 has low noise and image 508 is accordingly well suited to be processed by first branch operator 524-1 (and not well suited to be processed by second branch operator 524-2). In this case, image 522-1 (in first branch 516-1) is a copy of image 508 with an active flag. When image 522-1 is ready (and with an active flag), then first branch operator 524-1 performs a calculation on image 522-1 and outputs processed data to image 526-1, also with an active flag. If an active flag is associated with the input image 522-1, then the calculation may be substantial, for example, and processed data is output to image 526-1. Thus, branch operator 524-1 performs a calculation on image 522-1 for contrast enhancement, defogging, object recognition, etc.

On the other hand, when image 522-2 is ready (with an inactive flag) when the decision value 512 is '0', then second branch operator 524-2 does not perform a calculation on image 522-2 (or an insubstantial calculation, for example) and outputs image 526-2 with an inactive flag. If the active flag is not present (e.g., an inactive flag is present) in input data 522-2, then the operation performed by branch operator 524-2 may be as simple as doing nothing or passing an inactive flag with null data to output image 526-2.

Moving down FIG. 5A, combiner operator 528 performs a combiner operation. That is, when inputs to combiner operator 528 are ready, combiner operator 528 inputs processed data, flagged as active from one of the branches 516, and outputs the processed data. Combiner operator 528 may also input an inactive flag (and corresponding data) from another one of the branches, but in this case combiner operator 528 does not output data associated with an inactive flag.

Assume that decision value 512 is '0' again. In this case, image 522-1 (in first branch 516-1) is a copy of image 508 with an active flag. First branch operator 524-1 performs a calculation on image 522-1 and outputs processed data to image 526-1, also with an active flag. Combiner operator 528 outputs input image 526-1 (e.g. processed data) and because image 526-1 is associated with an active flag, combiner operator 528 outputs image 530 as a copy of image 526-1, flagged as active. On the other hand, image 522-2 is flagged as inactive and is effectively discarded because it is not output from combiner operator 528. In this embodiment, combiner operator 528 waits until all its inputs are ready (e.g., image 526-1 flagged as active or inactive, and image 526-2 flagged as active or inactive) before outputting image 530.

Final operator 532 inputs image 530 and performs a final operation and/or calculation on image 530. Final operator 504 outputs an output image 534. Final operator 532 may include, for example, a final operation for contrast enhancement, defogging, object recognition, etc. As noted above, in one implementation, hardware accelerator 322 does include final operator 532. Output image 534 may then be fetched or transferred from accelerator 322 to processor 320 (e.g., as image output data 486).

In the example of FIG. 5A, computer vision logic 450 can effectively perform, based on decision value 512, first branch operator 524-1 on image 508 or second branch operator 524-2 on image 508 without having to transfer image 508 from accelerator 322 to processor 320 and back again with the appropriate logic based on decision value 512. Thus, the embodiment of FIG. 5A may allow for less data transfer between heterogeneous devices (or in a heterogeneous environment), better performance, and simpler application code that is more portable than otherwise.

Figure 5B:
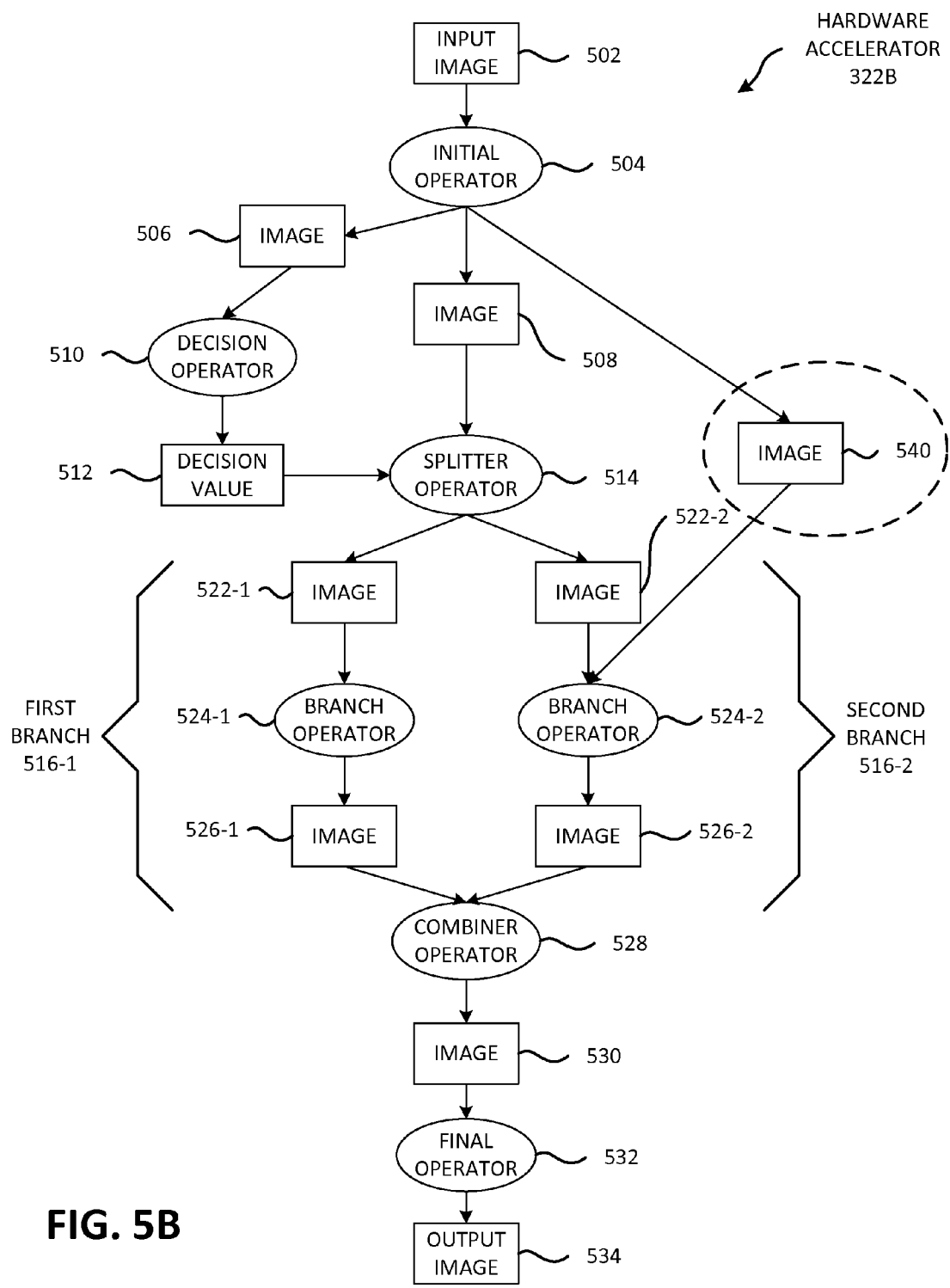

As the term is used herein, a "branch" may correspond to an "edge" in a graph. For example, as shown in FIG. 5B the line or edge between initial operator 504 to image 506 and decision operator 510 is a "branch." Also, the line or edge between splitter operator 514, image 522-1, and branch operator 524-1 is also a "branch." A branch may also correspond to a series of edges, such as the left-most set of lines between splitter operator 514 and combiner operator 528 (described as first branch 516-1); or the right-most set of lines between splitter operator 514 and combiner operator 528 (described as second branch 516-2). Parallel branches (such as first branch 516-1 and second branch 516-2) are referred to as "sibling" branches. As discussed in more detail below, parallel branches may be grouped into sets or groups of branches.

As noted above, hardware accelerator 322 may include differently arranged operators or data sets (including different dependencies), or additional operators or data sets than depicted in FIG. 5A. For example, a branch (e.g., a "parent" branch such as second branch 516-2) may itself include additional branches (e.g., "child" branches). That is, second branch 516-2 may include an additional splitter operator (not shown but subsequent to splitter operator 514) that creates two branches within second branch 516-2. In addition, second branch 516-2 may include an additional combiner operator (now shown but preceding combiner operator 528) that combines the two branches within second branch 516-2. In one embodiment, if a "parent" branch splits into two or more "child" branches (e.g., with a child splitter), then the child branches are combined (e.g., with a child combiner) before the parent branch is combined with its siblings. In another embodiment, the child branches are combined in the same combiner as its parent and the parent's siblings.

Hardware accelerator 322 in FIG. 5B includes the same or similar operators, data, and data dependencies of FIG. 5A, with the inclusion of image 540 (surrounded by a dashed line) that is output from initial operator 504. Image 540 is also input by branch operator 524-2 in second branch 516-2 as shown in FIG. 5B. The example of FIG. 5B demonstrates that a branch may receive input data (e.g., image 540) which bypasses (i.e., is not dependent on output of) splitter operator 514 (e.g., image 522-2). In other words, in this example the operation in one branch inputs data not dependent on the output of the splitter operation.

Figure 5C:
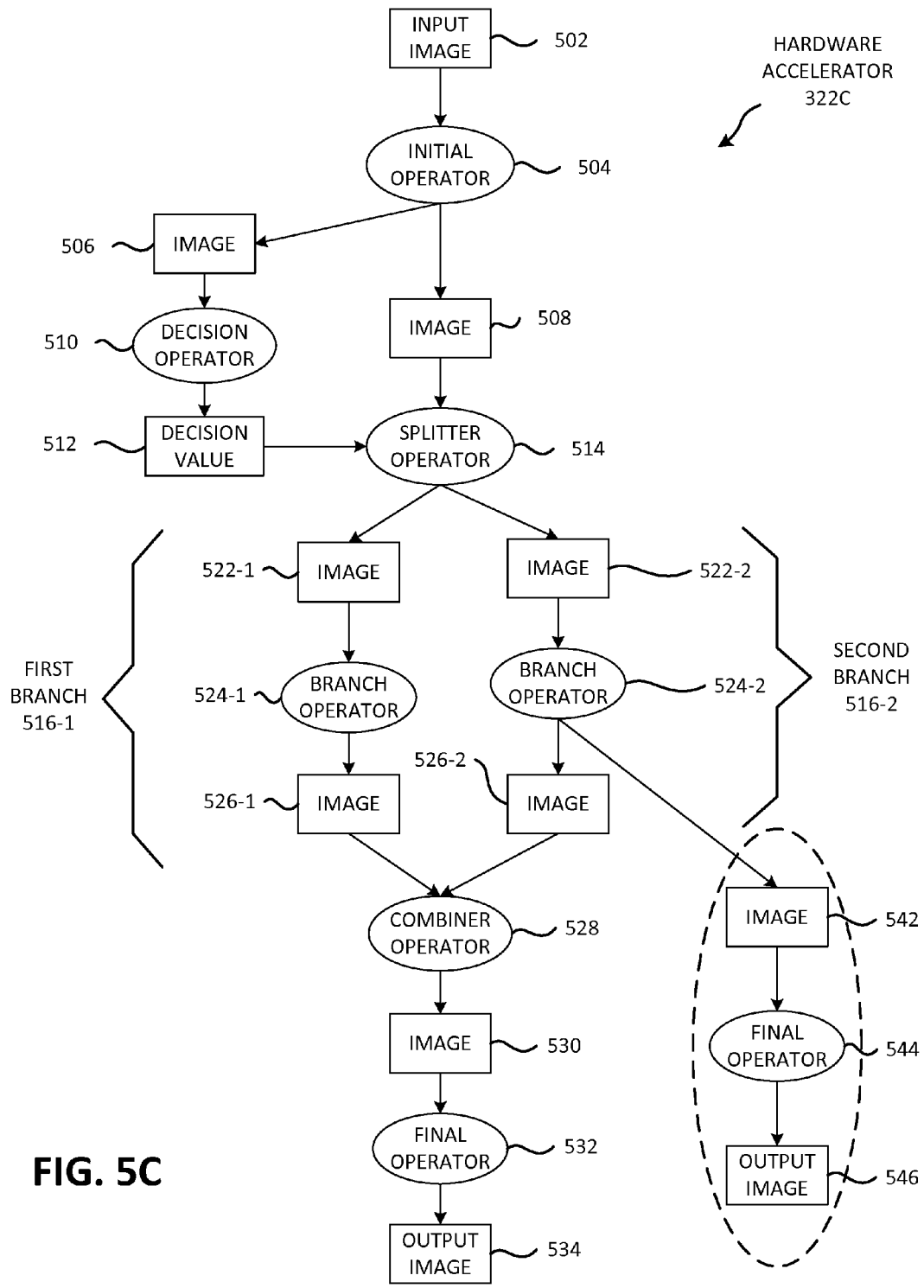

Hardware accelerator 322C in FIG. 5C includes the same or similar operators, data, and data dependencies of FIG. 5A, with the inclusion of image 542 (output from second branch operator 524-2), final operator 544 (that receives image 542), and output image 546 (output from final operator 544) (all surrounded by a dashed line). Thus, hardware accelerator 322C in FIG. 5C includes two final operators 532 and 544 and two output images 534 and 546. The example of FIG. 5C demonstrates that a branch may output data (e.g., second branch 516-2 outputting image 542) that bypasses combiner operator 528 (e.g., such as image 526-2). Final operator 544 passes along an inactive flag to output image 546 if an inactive flag is present in image 542. Otherwise, final operator 544 may perform an operation on image 542. In this example, processor 320 may determine if final operator 544 performed an operation on image 542 to generate output image 546 based on whether an active or inactive flag is associated with output image 546. In other words, in this example hardware accelerator 322 outputs data to processor 320 that is dependent on one of the branch operations and is not dependent on the combiner operation.

Figure 5D:
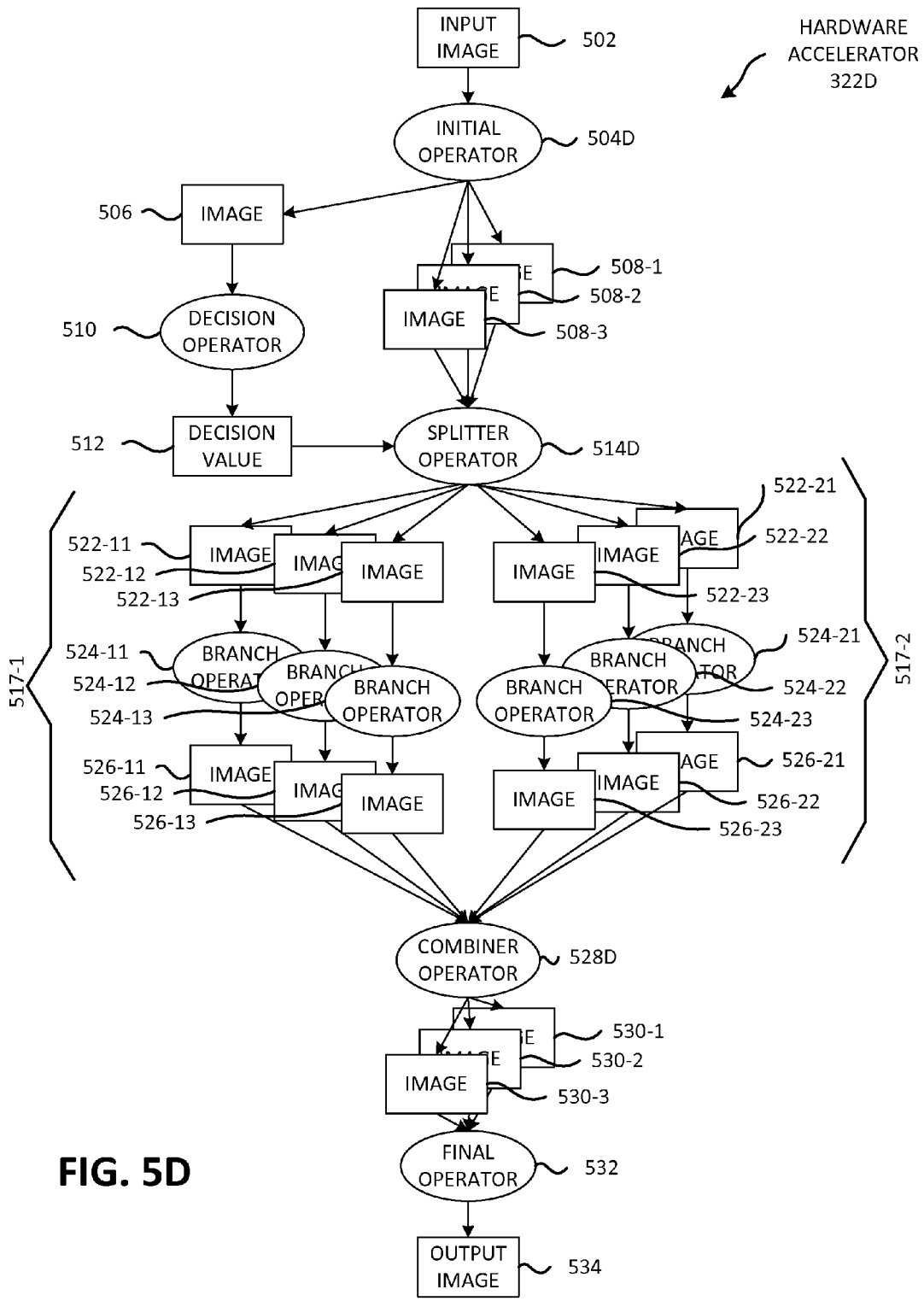

As mentioned above, in some embodiments, splitter operator 514 may input more than one image and output more than two images. Hardware accelerator 322D in FIG. 5D is an example of one such splitter operator (operator 514D). Accelerator 322D includes similar operators, data, and data dependencies as shown in FIG. 5A. In accelerator 322D, splitter operator 514D inputs three images 508-1, 508-2, and 508-3 (or three data sets) from initial operator 504D (which outputs the three images). In this example, splitter operator 514D also has six (rather than two) outputs: images 522-11, 522-12, 522-13, 522-21, 522-22, and 522-23. In this case, splitter operator 514D has six branches, which for convenience are grouped into a first group of branches 517-1 and a second group of branches 517-2. In addition, combiner 528D inputs six images 522-11, 522-12, 522-13, 522-21, 522-22, and 522-23 and outputs three images 530-1, 530-2, and 530-3.

In this example, splitter operator 514D outputs all three images 508-1, 508-2, and 508-3 to either first or second group of branches 517-1 or 517-2. That is, if decision value 512 is '0' then splitter operator 514D outputs image 508-1 as image 522-11 (flagged as active); image 508-2 as image 522-12 (flagged as active); and image 508-3 as image 522-13 (flagged as active). Also, if decision value 512 is '0' then splitter operator 514D outputs an inactive flag to image 522-21, 522-22, and 522-23. On the other hand, if decision value 512 is '1' then splitter operator 514D outputs image 508-1 as image 522-21 (flagged as active); image 508-2 as image 522-22 (flagged as active); and image 508-3 as image 522-23 (flagged as active). Also, if decision value 512 is '1' then splitter operator 514D outputs an inactive flag to image 522-11, 522-12, and 522-13.

In another embodiment, decision value 512 may pass any one of images 508-1, 508-2, and 508-3 to either first group of branches 517-1 or second group of branches 517-2 (e.g., independent of each other). In this case, decision value 512 may take on more than two values, such as eight values to satisfy all the possible combinations of outputs for splitter operator 514D (e.g., the number of branches raised to the power of the number of input images). That is, decision value 512 may be '001' for image 508-1 to pass to first group of branches 517-1 (with an active flag), for image 508-2 to pass to first group of branches 517-1 (with an active flag), and for image 508-3 to pass to second group of branches 517-2 (with an active flag). For every image 508 passed to one of the group of branches 517 with an active flag, an inactive flag is passed to another one of the group of branches. In one embodiment, decision operator 510 first generates an intermediate value (e.g., a byte value from 0 to 255) and uses the intermediate value as an index for a look-up table to determine decision value 512. In this way, different ranges of the intermediate value may correspond to different decision values 512. Also, the ranges of the intermediate value may be different sizes (e.g., creating a non-equal split).

Branches may be grouped together based on a number of factors. For example, in one case all of images 508 should be processed by operators 524-11, 524-12, and 524-13; or all of images 508 should be processed by operators 524-21, 524-22, and 524-23. Thus, it is convenient to group the branches associated with operators 524-11, 524-12, and 524-13 into a first set (or group) and the operators associated with operators 524-21, 524-22, and 524-23 into a second set (or group). In another case, operators 524-11, 524-12, and 524-13 may all be of the same type; and operators 524-21, 524-22, and 524-23 may all be of the same type (but different than operators 524-11, 524-12, and 524-13). In this case too, it is convenient to group the branches associated with operators 524-11, 524-12, and 524-13 into a first set (or group) and the operators associated with operators 524-21, 524-22, and 524-23 into a second set (or group). A "group" of branches may also be referred to herein as a "set" of branches.

In any case, a branch operator 524 performs a calculation (e.g., a non-insubstantial calculation) on an images 522 when that image 522 is accompanied with an active flag, and branch operator 524 outputs image 526 (e.g., processed) with an active flag in such a case. Images 522 associated with inactive flags may not be processed (e.g., or are insubstantially processed) and inactive flags are instead output to the respective output image 526.

In the example of FIG. 5D, combiner operator 528D performs a combiner operation. That is, when inputs to combiner operator 528D are ready, combiner operator 528 inputs processed data, flagged as active from branches 517, and outputs the processed data. Combiner operator 528D may also input an inactive flag (and corresponding data) from the other branches, but in this case combiner operator 528 does not output data associated with an inactive flag (e.g., combiner operator 528D does not copy as output the input data associated with an inactive flag).

Assume that decision value 512 is '0' again and that splitter operator 514D either outputs active flags to one group of branches (e.g., first group of branches 517-1 or second group of branches 517-2), and outputs inactive flags to the other group of branches. In this case, in first group 517-1, image 522-11 is a copy of image 508-1 with an active flag; image 522-12 is a copy of image 508-2 with an active flag; and image 522-13 is a copy of image 508-3 with an active flag. Branch operator 524-11 performs a calculation on image 522-11 and outputs processed data to image 526-11 flagged as active; branch operator 524-12 performs a calculation on image 522-12 and outputs processed data to image 526-12 flagged as active; and branch operator 524-13 performs a calculation on image 522-13 and outputs processed data to image 526-11 flagged as active.

On the other hand, when images 522-21, 522-22, and 522-23 are ready (with inactive flags) when the decision value 512 is '0', then second branch operators 524-21, 524-22, and 524-23 do not perform calculations on those images (or an insubstantial calculation, for example) and outputs images 526-21, 526-22, and 526-23 with an inactive flag. If the active flag is not present (e.g., an inactive flag is present) in input data 522-21, 522-22, and 522-23, then the operation performed by branch operators 524-21, 524-22, and 524-23 may be as simple as doing nothing or passing an inactive flag with null data to output images 526-21, 526-22, and 526-23.

Continuing with this example, combiner operator 528D inputs images 526-11, 526-12, and 526-13 (e.g. processed data) and because these images are associated with active flags, combiner operator 528D outputs images 530-1, 530-2, and 530-3 as a copy of images 526-11, 526-12, and 526-13 (which, in one embodiment, are also flagged as active). On the other hand, images 526-21, 526-22, and 526-23 are flagged as inactive and are effectively discarded because they are not output from combiner operator 528.In the example of FIG. 5D, computer vision logic 450 can effectively perform, based on decision value 512, branch operator 524-1 in first group of branches 517-1 on images 508 or operator 524-2 operator 524-2 in second group of branches 517 on images 508 without necessarily having to transfer images 508 from accelerator 322D to processor 320 and back again with the appropriate logic based on decision value 512. Thus, the embodiment of FIG. 5D may allow for less data transfer between heterogeneous devices (or in a heterogeneous environment), better performance, and simpler application code that is more portable than otherwise.

Figure 5E:
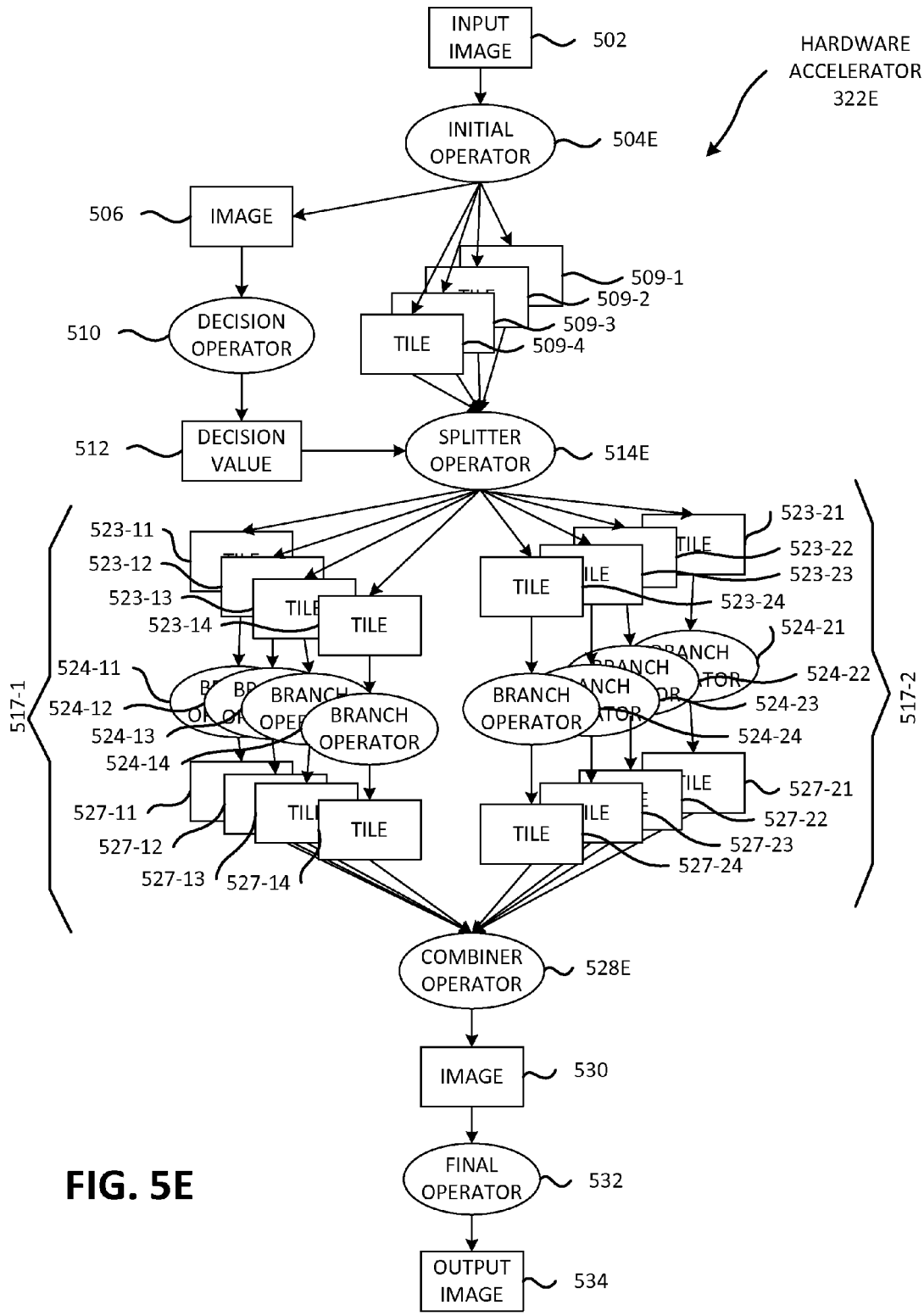
Figure 6:
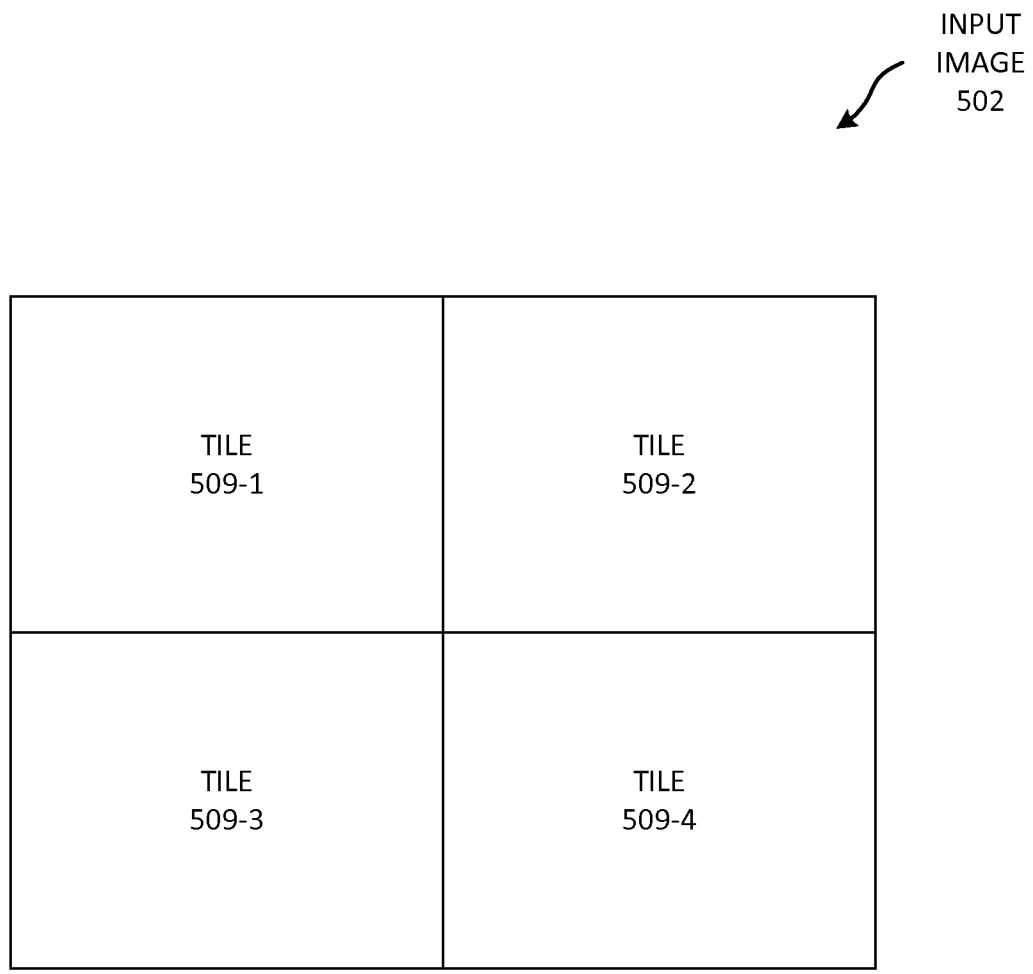
FIG. 6 is a diagram of an image divided into four tiles.
Figure 7:
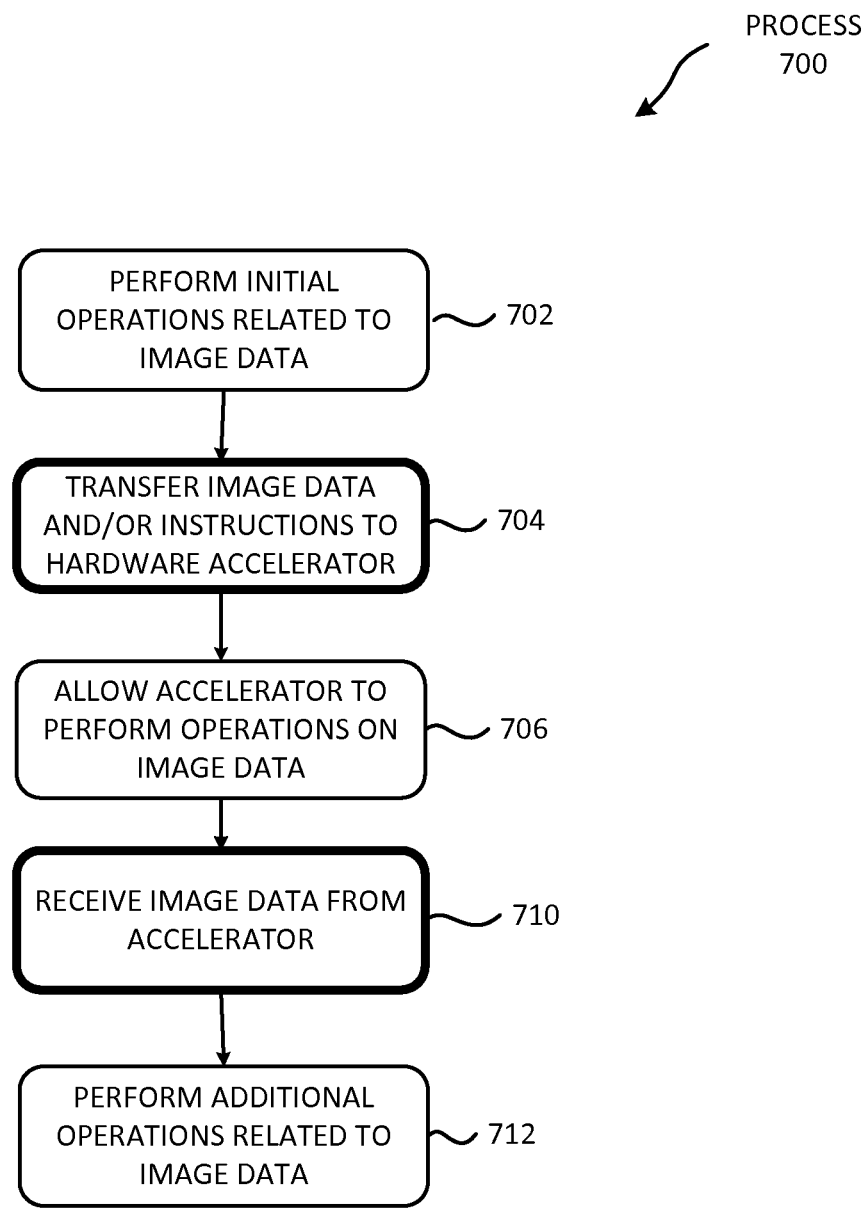
FIGS. 7 through 10 are flowcharts of an exemplary processes for performing conditional flow in a heterogeneous environment in one embodiment.

Hardware accelerator 322E in FIG. 5E includes similar operators, data, and data dependencies as shown in FIG. 5A. In accelerator 322E, initial operator 504E inputs image 502 and splits image 502 into a set of tiles as output: tiles 509-1, 509-2, 509-3, and 509-4. In this embodiment, each tile may be a different portion of input image 502. FIG. 6 is a diagram of an image 502 divided into four tiles (e.g., tiles 509-1, 509-2, 509-3, and 509-4). In one implementation, the header in each tile indicates its location within input image 502. In one embodiment, initial operator 504 may perform operations in addition to dividing input image 502 into various different tiles. Although FIGS. 5E and 6 show four tiles, any number of tiles is possible (e.g., thousands or millions of tiles).

In accelerator 322E, splitter operator 514E inputs four tiles 509-1, 509-2, 509-3, and 509-4 (or four data sets) from initial operator 504E (which outputs the four tiles). In this example, splitter operator 514E also has eight (rather than two) outputs: tiles 523-11, 523-12, 523-13, 523-14, 523-21, 523-22, 523-23, and 523-24. In example of FIG. 5E, splitter operator 514E has eight outputs: tile 523-11, 523-12, 523-13, 523-14, 523-21, 523-22, 523-23, and 523-24. Thus, accelerator 322E has eight branches, which for convenience are grouped into a first group 517-1 and a second group 517-2.

In one embodiment, decision value may pass any one of tiles 509 to either first group of branches 517-1 or second group of branches 517-2 (e.g., independently). In this case, decision value 512 may take on more than two values, such as 16 values to satisfy all the possible combinations of outputs for splitter operator 514E (e.g., the number of branches raised to the power of the number of input tiles). That is, decision value 512 may be '0101' for tiles 509-1 and 509-3 to pass to first group of branches 517-1 (with an active flag) and for tiles 509-2 and 509-4 to pass to second group of branches 517-2 (with an active flag). In this example, for every tile 509 passed to one of the group of branches with an active flag, an inactive flag is passed to another one of the group of branches (i.e., in the other group).

In other words, splitter operator 514E outputs, based on the decision value, each of the data sets to be processed (tiles 509-1, 509-2, 509-3, and 509-4), flagged as active, to one of more than two branches (e.g., eight) of data dependencies and operations. Splitter operator 514E also outputs, based on the decision value, an inactive flag to a different one of the branches for each of the data sets.

In any case, a branch operator 524 performs a calculation on a tile 523 when that tile 523 is accompanied with an active flag, and branch operator 524 outputs tile 527 (e.g., processed) with an active flag in such a case. Tiles 523 associated with inactive flags may not be processed (or insubstantially processed) and inactive flags are instead output to the respective output tile 527. Accordingly, each tile 509 is either processed by operator 524-1 and associated with an active flag or processed by operator 524-2 and associated with an active flag.

Combiner operator 528E takes the various tiles 527 from both groups of branches 517 and outputs those tiles 527 having active flags, while effectively discarding tiles 527 with inactive flags. Because each tile indicates its position (e.g., in the header of the data), the output from combiner operator 528E may also reassemble the tiles into image 530. Final operator 532 inputs image 530, performs calculations (such as smoothing the image at the borders of tiles), and outputs image 534.

In the example of FIG. 5E, computer vision logic 450 (having accelerator 322D) can effectively perform, based on decision value 512, branch operator 524-1 in first group of branches 517-1 on tiles 509 or operator 524-2 in second group of branches 517-2 on tiles 509 without necessarily having to transfer tiles 509 from accelerator 322E to processor 320 and back again with the appropriate logic based on decision value 512. Thus, the embodiment of FIG. 5E may allow for less data transfer between heterogeneous devices (or in a heterogeneous environment), better performance, and simpler application code that is more portable than otherwise.

Hardware accelerator 322 may include differently arranged operators or data sets (including different dependencies), or additional operators or data sets than depicted in FIGS. 5A through 5E. As noted above, for example, a branch may itself include additional branches. In addition, the embodiment of FIG. 5C may be combined with the embodiment of FIG. 5E. In FIG. 5C, hardware accelerator 322C, outputs data (image 546) dependent on the operator 524-2 in branch 516-2 but not dependent on combiner operator 528. In FIG. 5E, an image 502 is split by splitter operator 514E into tiles 509. Such a configuration may provide useful information in the additional output image that is not dependent on the combiner operator (e.g., image 546), even if that additional output image (e.g., output image 546) does not include all the information from all the tiles 509.

In one embodiment, as shown with respect to splitter operators 514D and 514E, the number of output images flagged as active equals the number of input images. In one embodiment, the number of output images flagged as active is a whole multiple of output images flagged as inactive. As discussed above, images output from splitter 514D and/or 514E (flagged as active) may all go to one group of branches (e.g., branch 517-1). In another embodiment, images output from splitter 514D and/or 514E may be distributed among different groups of branches (e.g., branch 517-1 and branch 517-2). In other words, not all of the output images flagged as active are necessarily sent to the same group of branches.

In one embodiment, images in the same group of branches may "interact" with each other in that a branch operator may have access to both images in that branch. That is, a branch operator may have access to images in other branches in the same group of branches (but not necessarily in a different group of branches). In this embodiment, images in different groups of branches may not interact in that a branch operator may not have access to both images at the same time (e.g., at least not in as an efficient manner).

In another embodiment, splitter node 514D inputs M images and outputs M images flagged as active to one group of branches 517 (e.g., branch 517-1 or branch 517-2). In the case of FIG. 5D, M is three (3) and the number of branches (or edges) is six (6), which are grouped into two sets (or groups). Combiner operator 528 D inputs N images (flagged as active) and outputs N images. The value of M does not necessarily equal the value of N, but each group of branches should produce N images for combiner operator 528D. In the case of FIG. 5D, N is also three (3) and the N input images (flagged as active) are input through six (6) branches (or edges).

FIGS. 7 through 10 are flowcharts of an exemplary processes for performing conditional flow in a heterogeneous environment in one embodiment. As noted above, computer vision logic 450 may have a logic component in processor 320 and/or a logic component in accelerator 322. Process 700 is the component that occurs in processor 320 in the current example.

Process 700 begins with the performance of operations related image data (block 702). That is, processor 320 performs calculations associated with sensor data 482 (FIG. 4), for example. Because processor 320 is not optimized to perform some desired functions, image data and/or instructions are transferred to hardware accelerator 322 (block 704). As noted above, the amount of data in image input data 484 may be large and the transfer of the data is costly from a performance perspective.

Process 700 continues with processor 320 allowing accelerator 322 to perform the desired calculations on input data 484 (block 706). Some of these instructions are described above with respect to FIGS. 5A through 5E and below with respect to FIGS. 8 through 10. After completion, processor 320 fetches or receives the output image data 486 from accelerator 322 (block 710). As noted above, the amount of data in image data 486 may be large and the transfer of the data from accelerator 322 to processor 320 is costly from a performance perspective. Processor 320 may then perform additional operations related to the image data (block 712).

Figure 8:
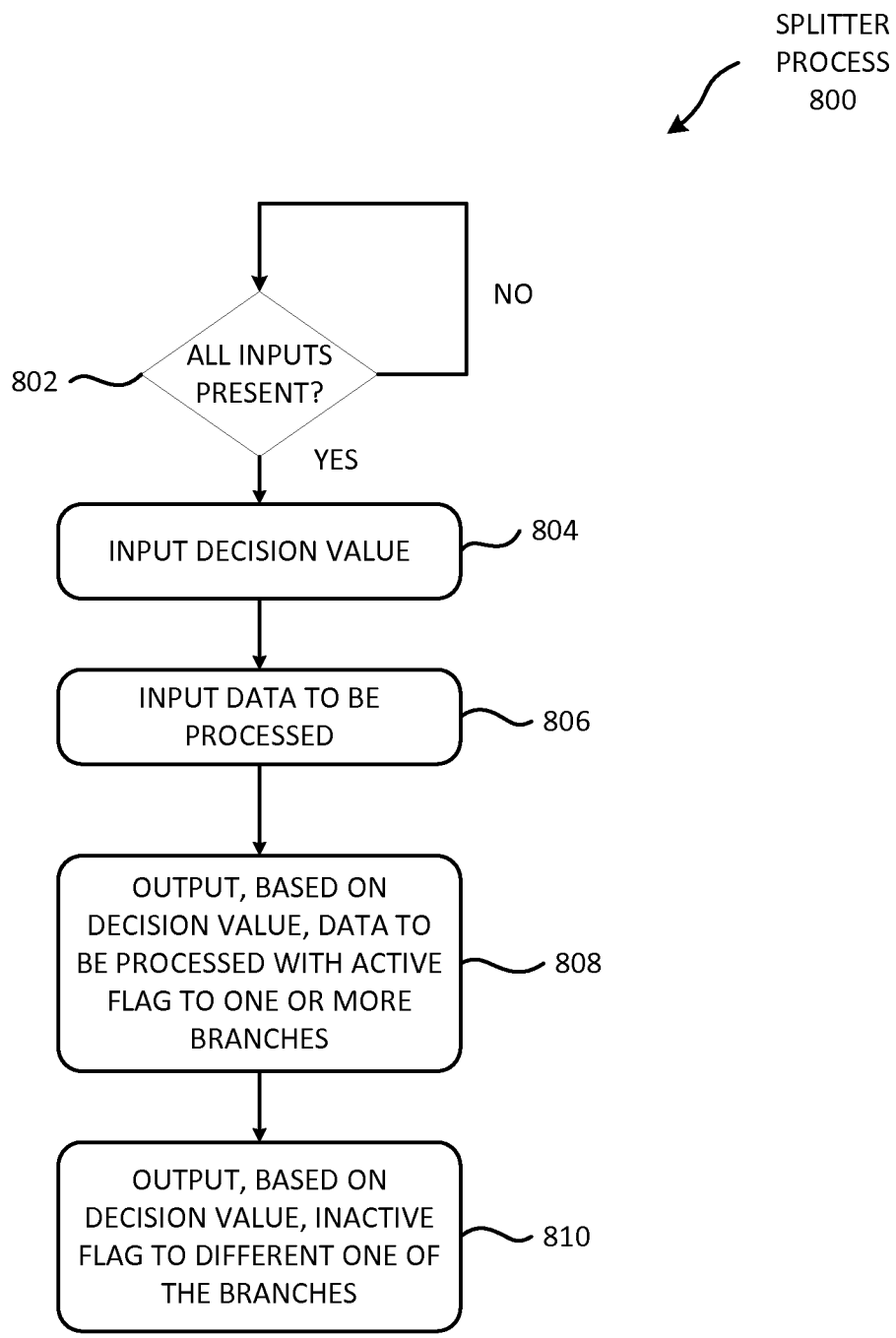

FIG. 8 is a flowchart of an exemplary splitter process 800 for splitter operator 514 in one embodiment. Process 800 may be performed in camera 110, for example, in hardware accelerator 322. Because of the nature of hardware accelerator 322, process 800 may run independently of other operators in hardware accelerator 322 (e.g., independently of initial operator 504, branch operators 524, combiner operator 528, etc.) Process 800 is described with respect to the operators, data, and data dependencies shown in FIG. 5A.

When the inputs are not ready (block 802: NO), then splitter operator 514 continues to wait until inputs are ready (block 802). When all the inputs to splitter operator 514 are ready (block 802: YES), then splitter operator 514 inputs the decision value 512 (block 804) and data to be processed (block 806). Splitter operator 514 then outputs, based on the decision value, the data to be processed, flagged as active, to one of a plurality of branches (block 808). Further, splitter operator outputs, based on the decision value, an inactive flag to a different one of the branches (block 810). As noted above, the inactive flag may be associated with null or dummy data, for example.

Figure 9:
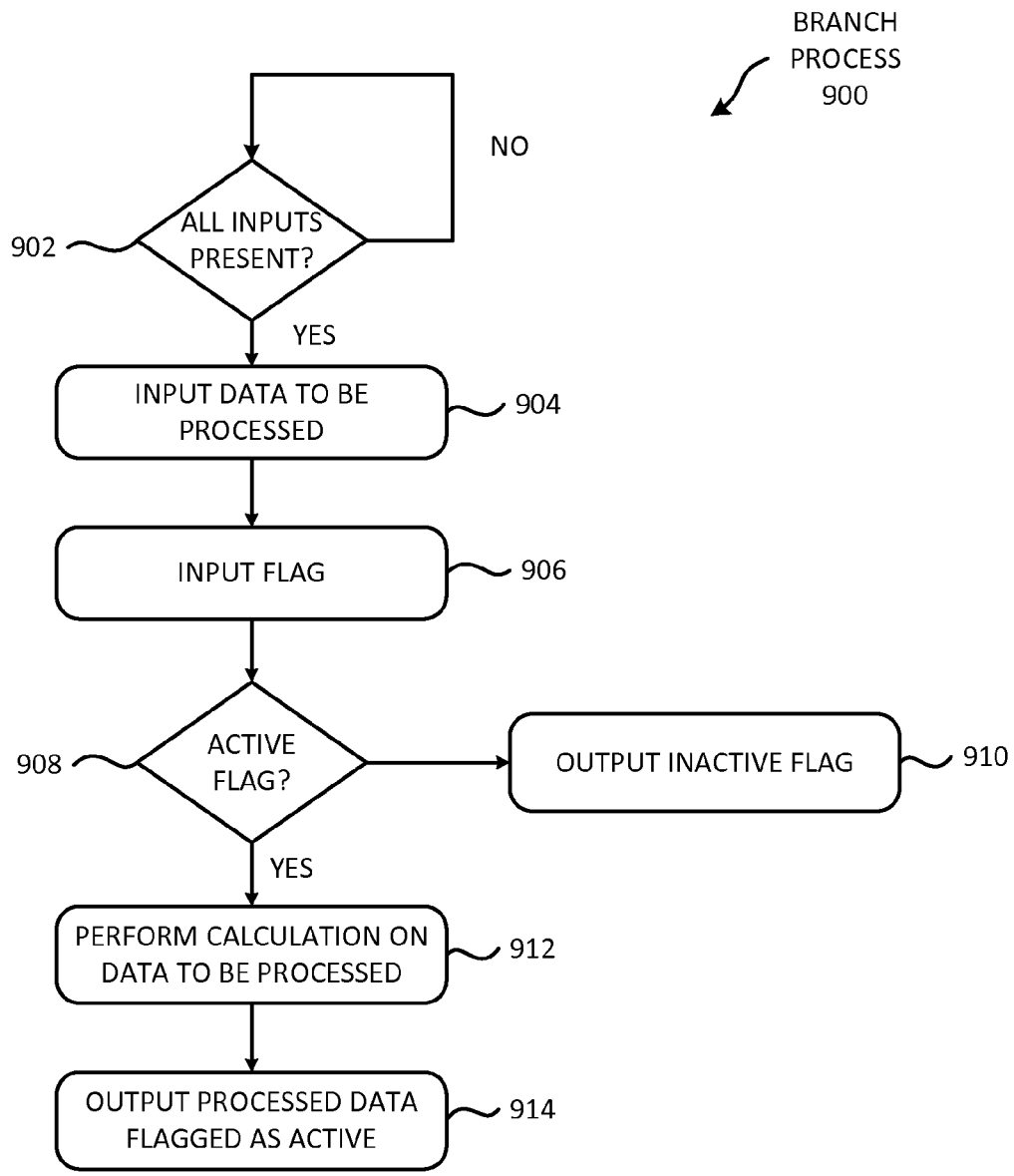

FIG. 9 is a flowchart of an exemplary process 900 for branch operator 524 in one embodiment. Process 900 may be performed in camera 110, for example, in hardware accelerator 322. Because of the nature of hardware accelerator 322, process 900 may run independently of other operators in hardware accelerator 322 (e.g., independently of initial operator 504, splitter operator 514, combiner operator 528, etc.) Process 900 is described with respect to the operators, data, and data dependencies shown in FIG. 5A.

When the inputs are not ready (block 902: NO), then branch operator 524 continues to wait until inputs are ready (block 902). When all the inputs to branch operator 524 are ready (block 902: YES), then branch operator 524 inputs the active/inactive flag (block 906) and data (block 904) (e.g., image 522). If the flag is not an active flag (block 908: NO), then branch operator 524 outputs an inactive flag (e.g., associated with image 526). As noted above, the inactive flag may be associated with null or dummy data, for example. In this case (block 908: NO), hardware accelerator 322 may be spared from performing unnecessary calculations on any input data associated with an inactive flag.

If the flag is an active flag (block 908: YES), then branch operator 524 performs a calculation on the input data (e.g., image 522, which in this case is data to be processed). When complete with the calculation, branch operator 524 outputs the processed data to image 526 with an active flag. In this case (block 908: NO), hardware accelerator 322 performs a calculation on input data to be processed that is associated with an active flag.

Figure 10:
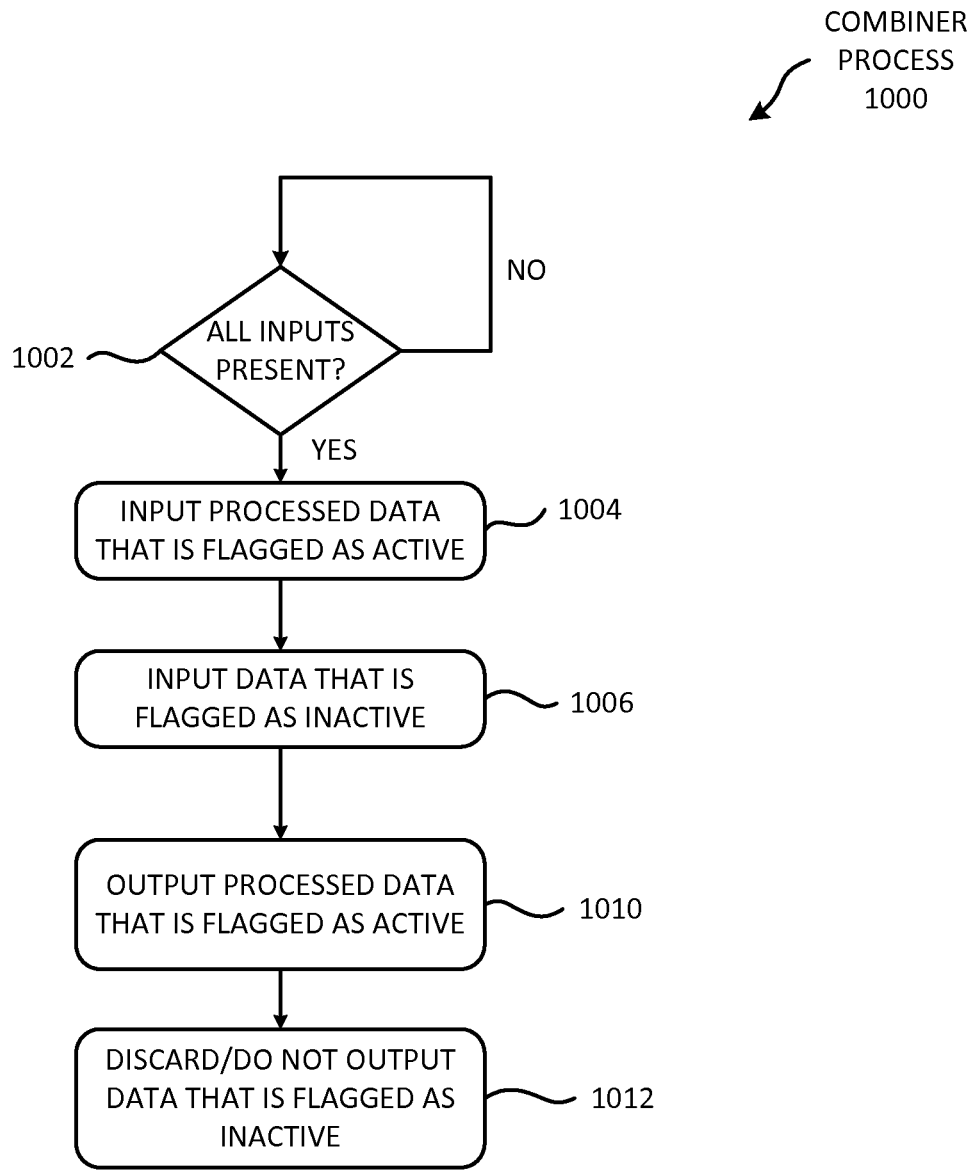

FIG. 10 is a flowchart of an exemplary combiner process 1000 for combiner operator 528 in one embodiment. Process 1000 may be performed in camera 110, for example, in hardware accelerator 322. Again, because of the nature of hardware accelerator 322, process 1000 may run independently of other operators in hardware accelerator 322 (e.g., independently of initial operator 504, splitter operator 514, branch operator 524, etc.) Process 1000 is described with respect to the operators, data, and data dependencies shown in FIG. 5A.

When the inputs are not ready (block 1002: NO), then combiner operator 528 continues to wait until inputs are ready (block 1002). When all the inputs to combiner operator 528 are ready (block 1002: YES), then combiner operator 528 inputs the image 526 from branches 516, including the processed data flagged as active (block 1004). Combiner operator 528 also inputs the image 526 flagged as inactive (block 1006). Combiner operator outputs image 526 that is flagged as active to image 530, which (in one embodiment) may also flagged as active (block 1008). Effectively, combiner operator discards the input image 526 that is flagged as inactive (block 1010).

In one embodiment, as shown in FIG. 5D, splitter operator 514D inputs multiple images 508 (e.g., three) and outputs multiple images 522 (also three). Combiner operator 528D also outputs the same number of images (e.g., three) as input by splitter operator 514D.

In another embodiment, as shown in FIG. 5E, splitter operator 514E has multiple inputs (e.g., four tiles 509) and has multiple outputs (e.g., eight tiles 523). Combiner operator 528E has one output (e.g., image 530). Thus, the number of inputs to splitter operator 514E is different than the number of outputs from combiner operator 528E. In this particular embodiment, however, the number of input images (e.g., one input image 502) is the same as the number of output images (e.g., one image 530).

In another embodiment, a combiner (such as combiner operator 528D or 528E or any other operator in hardware accelerator 322) does not wait until all inputs are present (e.g., contrary to block 1002). In this embodiment, splitter operator 528D or 528E, for example, waits until a threshold number of inputs are present, such as a threshold number of inputs with active flags (e.g., half of the total number of inputs).

In the preceding specification, various embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense. For example, while series of blocks have been described with respect to processes 700 through 1000, the order of the blocks and/or signal flows may be modified in other implementations. Further, non-dependent blocks and/or signal flows may be performed in parallel.

It will be apparent that systems and/or methods, as described above, may be implemented in many different forms of software, firmware, and hardware in the implementations illustrated in the figures. The actual software code or specialized control hardware used to implement these systems and methods is not limiting of the embodiments. Thus, the operation and behavior of the systems and methods were described without reference to the specific software code—it being understood that software and control hardware can be designed to implement the systems and methods based on the description herein.

Further, certain portions, described above, may be implemented as a component that performs one or more functions. A component, as used herein, may include hardware, such as a processor, an ASIC, or a FPGA, or a combination of hardware and software (e.g., a processor executing software).

The term "logic," as used herein, may refer to a combination of one or more processors configured to execute instructions stored in one or more memory devices, may refer to hardwired circuitry, and/or may refer to a combination thereof. Furthermore, a logic may be included in a single device or may be distributed across multiple, and possibly remote, devices.

It should be emphasized that the terms "comprises" and/or "comprising," as used herein specify the presence of stated features, integers, steps or components but does not preclude the presence or addition of one or more other features, integers, steps, components or groups thereof. Further, the term "exemplary" (e.g., "exemplary embodiment," "exemplary configuration," etc.) means "as an example" (e.g., "an embodiment in an example," "a configuration in one example," etc.).

No element, act, or instruction used in the present application should be construed as critical or essential to the embodiments unless explicitly described as such. Also, as used herein, the article "a" is intended to include one or more items. Further, the phrase "based on" is intended to mean "based, at least in part, on" unless explicitly stated otherwise.

What is claimed is:

1. A system comprising:
   a computing device; and
   a hardware accelerator coupled to the computing device, wherein the hardware accelerator receives instructions describing operations and data dependencies between the operations, wherein the operations and the data dependencies are predetermined, wherein the instructions cause the hardware accelerator to perform:
   a splitter operation to:
      input a decision value and data to be processed,
      output, based on the decision value, the data to be processed, flagged as active, to one of a plurality of branches of data dependencies and operations,
      output, based on the decision value, an inactive flag to a different one of the plurality of branches;
   wherein each branch includes an operation to:
      input the data to be processed, flagged as active, output by the splitter operation,
      perform a calculation on the data to be processed, flagged as active, and output processed data flagged as active, and
      output an inactive flag when the inactive flag is accessed via the splitter operation, and
   a combiner operation to:
      input processed data, flagged as active from one of the branches, and input an inactive flag from another one of the branches, and
      output the processed data.

2. The system of claim 1, wherein the data dependency of each of the plurality of branches is independent of each other branch.

3. The system of claim 1, wherein the instructions describe the data dependencies between the operations without explicitly-stated ordering of execution of operations.

4. The system of claim 1, wherein the instructions cause the hardware accelerator to perform the splitter operation further to:
   output, based on the decision value, a dummy data set with the inactive flag to the different one of the branches of data dependencies.

5. The system of claim 1, wherein the operation in one branch inputs data not dependent on the output of the splitter operation.

6. The system of claim 1, wherein the hardware accelerator outputs data dependent on the operation in one of the branches and not dependent on the combiner operation.

7. The system of claim 1, wherein the instructions cause the hardware accelerator to perform a decision operation that outputs the decision value, wherein the decision value is one of more than two values.

8. The system of claim 7, wherein the instructions cause the splitter operation to further:
   input a plurality of data sets to be processed,
   output, based on the decision value, each of the data sets to be processed, flagged as active, to one of more than two branches of data dependencies and operations, and
   output, based on the decision value, an inactive flag to a different one of the branches for each of the data sets.

9. The system of claim 8, wherein each of the plurality of data sets to be processed is a tile of an image.

10. The system of claim 1, wherein one of the plurality of branches includes an additional splitter operator and an additional combiner operator.

11. A method comprising:
   receiving instructions in a hardware accelerator coupled to a computing device, wherein the instructions describe operations and data dependencies between the operations, and wherein the operations and the data dependencies are predetermined;
   performing a splitter operation in the hardware accelerator, including:
      inputting a decision value and data to be processed,
      outputting, based on the decision value, the data to be processed, flagged as active, to one of a plurality of branches of data dependencies and operations, and outputting, based on the decision value, an inactive flag to a different one of the plurality of branches;

performing an operation in each branch including:
  inputting the data to be processed, flagged as active, output by the splitter operation,
  performing a calculation on the data to be processed, flagged as active, and outputting processed data flagged as active, and
  outputting an inactive flag when the inactive flag is accessed via the splitter operation; and performing a combiner operation in the hardware accelerator including:
  inputting processed data, flagged as active from one of the plurality of branches, and inputting an inactive flag from another one of the plurality of branches, and
  outputting the processed data.

12. The method of claim 11, wherein the data dependency of each of the plurality of branches is independent of each other branch.

13. The method of claim 11, wherein the instructions describe the data dependencies between the operations without explicitly-stated ordering of execution of operations.

14. The method of claim 11, wherein performing the splitter operation includes:
  outputting, based on the decision value, a dummy data set with the inactive flag to the different one of the branches of data dependencies.

15. The method of claim 11, wherein performing the operation in one branch includes inputting data not dependent on the output of the splitter operation.

16. The method of claim 11, further comprising outputting data dependent on the operation in one of the branches and not dependent on the combiner operation.

17. The method of claim 11, further comprising performing a decision operation that outputs the decision value, wherein the decision value is one of more than two values.

18. The method of claim 17, wherein performing the splitter operation includes:
  inputting a plurality of data sets to be processed,
  outputting, based on the decision value, each of the data sets to be processed, flagged as active, to one of more than two branches of data dependencies and operations, and
  outputting, based on the decision value, an inactive flag to a different one of the branches for each of the data sets.

19. The method of claim 18, wherein each of the plurality of data sets to be processed is a tile of an image.

20. The method of claim 11, wherein performing an operation in each branch includes performing an additional splitting operation and performing an additional combiner operation.

* * * * *